(12) United States Patent
Abe

(10) Patent No.: US 11,283,197 B2
(45) Date of Patent: Mar. 22, 2022

(54) CONNECTION STRUCTURE OF ELECTRIC WIRE AND AUXILIARY TERMINAL

(71) Applicant: Connect Fusion G.k, Himeji (JP)

(72) Inventor: Hirokazu Abe, Himeji (JP)

(73) Assignee: Connect Fusion G.k, Himeji (JP)

( * ) Notice: Subject to any disclaimer, the term of this patent is extended or adjusted under 35 U.S.C. 154(b) by 804 days.

(21) Appl. No.: 16/300,187

(22) PCT Filed: Feb. 7, 2018

(86) PCT No.: PCT/JP2018/004125
§ 371 (c)(1),
(2) Date: Nov. 9, 2018

(87) PCT Pub. No.: WO2018/220902
PCT Pub. Date: Dec. 6, 2018

(65) Prior Publication Data
US 2021/0226349 A1  Jul. 22, 2021

(30) Foreign Application Priority Data

May 31, 2017  (JP) .............................. JP2017-107909

(51) Int. Cl.
*H01R 4/20*  (2006.01)
*H01R 4/02*  (2006.01)
(Continued)

(52) U.S. Cl.
CPC .......... *H01R 4/023* (2013.01); *H01M 50/528* (2021.01); *H01R 4/027* (2013.01);
(Continued)

(58) Field of Classification Search
CPC .......... H01R 4/023; H01R 4/18; H01R 4/184; H01R 4/20; H01R 4/28; H01R 4/48; H01R 12/53; H01R 12/57; H01R 12/59
(Continued)

(56) References Cited

U.S. PATENT DOCUMENTS 3,546,663 A * 12/1970 Centre, Jr. ............. H01R 13/20
439/849
4,963,699 A * 10/1990 Urushibata .......... H01R 12/613
174/72 A
(Continued)

FOREIGN PATENT DOCUMENTS

JP       07-057790 A     3/1995
JP    2015-049932 A     3/2015

OTHER PUBLICATIONS

International Search Report dated Apr. 3, 2018, issued for PCT/JP2018/004125.
(Continued)

*Primary Examiner* — William H. Mayo, III
(74) *Attorney, Agent, or Firm* — Locke Lord LLP

(57) ABSTRACT

The connection structure connecting a core wire exposed, on the end side of a covered electric wire with an insulating covering portion covering the outer periphery of the core wire, from the insulating covering portion to a bus bar. On the end side of the covered electric wire, an auxiliary terminal including an electric wire grasping portion which grasps the insulating covering portion of the covered electric wire and a core wire protecting portion provided so as to extend from one end of the electric wire grasping portion is attached. The core wire protecting portion includes a base on which the insulating covering portion is placed and welded pieces which are provided so as to extend from the base and disposed near the core wire exposed from the insulating covering portion, and the welded pieces are welded to one face of the bus bar along with the exposed core wire.

18 Claims, 17 Drawing Sheets

(51) Int. Cl.
*H01M 50/528* (2021.01)
*H01R 4/18* (2006.01)

(52) U.S. Cl.
CPC ............. *H01R 4/183* (2013.01); *H01R 4/184* (2013.01); *H01R 4/185* (2013.01)

(58) Field of Classification Search
USPC .......... 174/74 R, 79, 84 R, 88 R, 94 R, 84 C
See application file for complete search history.

(56) References Cited

U.S. PATENT DOCUMENTS

| | | | | |
|---|---|---|---|---|
| 5,408,048 | A * | 4/1995 | Endo | H01R 4/2462 174/74 R |
| 5,762,521 | A * | 6/1998 | Tanaka | H01R 12/777 439/492 |
| 6,024,596 | A * | 2/2000 | Tanaka | H01R 4/029 439/492 |
| 6,392,148 | B1 * | 5/2002 | Ueno | B60R 16/0215 174/72 A |
| 7,581,966 | B2 * | 9/2009 | Shigehisa | H01R 4/185 439/98 |
| 2002/0155757 | A1 * | 10/2002 | Yoshioka | H01R 9/034 439/607.01 |
| 2004/0142607 | A1 * | 7/2004 | Asakura | H01R 43/0221 439/877 |
| 2014/0312097 | A1 * | 10/2014 | Miyazato | H01R 43/00 228/111 |
| 2015/0280359 | A1 * | 10/2015 | Nagy | H01R 13/5812 439/470 |
| 2016/0079684 | A1 * | 3/2016 | Naganishi | H01R 4/16 439/877 |
| 2017/0141487 | A1 * | 5/2017 | Tamura | H01R 4/184 |
| 2019/0148843 | A1 * | 5/2019 | Idota | H01R 43/0207 439/874 |
| 2019/0165492 | A1 * | 5/2019 | Warashina | H01R 4/187 |
| 2019/0356062 | A1 * | 11/2019 | Sato | H01R 43/048 |
| 2020/0227839 | A1 * | 7/2020 | Tsuchiya | H01R 4/185 |

OTHER PUBLICATIONS

Mitutoshi Fujita, "Reinforcing plate for soldering connector lead terminal," Journal of Technical Disclosure, Kokai No. 96-6058, Japan Institute of Invention and Innovation, May 15, 1996, 1 sheet and the machine English translation thereof. (cited in the ISR).

* cited by examiner

CONNECTION STRUCTURE OF ELECTRIC WIRE AND AUXILIARY TERMINAL

TECHNICAL FIELD

The present invention relates to connection structures of an electric wire and auxiliary terminals and relates to, for example, a connection structure of an electric wire, the connection structure which connects an electric wire to a conductive metal plate such as a bus bar, and an auxiliary terminal that is used to connect an electric wire to a conductive metal plate such as a bus bar.

BACKGROUND ART

In PTL 1, the configuration of an in-battery wiring module which is attached to the upper face of a battery module configured with a plurality of stacked battery cells is disclosed. This in-battery wiring module includes bus bars that are connected to electrode posts of the battery cells, voltage monitoring wires whose one ends are connected to the bus bars, and a voltage monitoring unit to which the other ends of the voltage monitoring wires are connected.

Moreover, in the above-described in-battery wiring module, for connection of the voltage monitoring wires to the bus bars, welding means such as resistance welding, fiber laser welding, and ultrasonic welding are used.

It is to be noted that, as the above-described voltage monitoring wire, a covered electric wire having a core wire and an insulating covering portion covering the outer periphery of the core wire is generally used. The core wire is exposed by removing the insulating covering portion on the end side of the voltage monitoring wire, and only a part thereof corresponding to the core wire exposed from the insulating covering portion is welded to the bus bar.

CITATION LIST

Patent Literature

[PTL 1] JP-A-2015-49932

SUMMARY OF INVENTION

Technical Problem

However, "a connection structure of an electric wire, in which only a core wire exposed from an insulating covering portion is welded to a bus bar" like the above-described existing technique has a technical problem of difficulty in achieving sufficient tensile strength. In particular, since a covered electric wire which is thinner than a power wire is generally used as the above-described voltage monitoring wire, the connection structure in which only the core wire exposed from the insulating covering portion is welded cannot achieve sufficient tensile strength. As a result, with the above-described existing technique, there is fear that the welds of the core wire and the bus bar become detached from each other. For instance, with the above-described existing technique, there is fear that the core wire becomes detached from the bus bar during an operation of attaching, to the upper face of the battery module, the in-battery wiring module in a state in which the core wire on the end side of the voltage monitoring wire drawn from the voltage monitoring unit is connected to the bus bar by welding.

It is to be noted that, as a connecting method that solves the above-described problem, there is a method by which a voltage monitoring wire and a bus bar are connected by connecting a ring terminal to a core wire by crimping, the core wire exposed on the end side of the voltage monitoring wire, positioning the ring terminal on a through hole (a bolt hole) provided in the bus bar, inserting a bolt into the through hole, attaching a nut to the bolt, and tightening the bolt and the nut to connect the ring terminal and the bus bar.

However, the method of connecting an electric wire by using a ring terminal and a bolt and a nut requires, in addition to an operation of setting the bolt and the nut, an operation of tightening the bolt and the nut, which causes another problem of time and trouble needed to perform a connecting operation. In particular, the method of connecting an electric wire by using a bolt and a nut causes a significant increase in the number of man-hours needed for a connecting operation if this method is adopted for "a product with a large number of connections" like the in-battery wiring module described in PTL 1.

The present invention has been made in view of the above-described technical problems and an object thereof is to provide a connection structure of an electric wire, the connection structure that can firmly connect an electric wire to a conductive metal plate without greatly increasing a burden of a connecting operation, and an auxiliary terminal for connecting an electric wire to a conductive metal plate.

Solution to Problem

The present invention that has been made to solve the above-described technical problems is directed to a connection structure of an electric wire, the connection structure which connects a core wire exposed, on the end side of a covered electric wire with an insulating covering portion covering the outer periphery of the core wire, from the insulating covering portion to a conductive metal plate, wherein, on the end side of the covered electric wire, an auxiliary terminal including an electric wire grasping portion which grasps the insulating covering portion of the covered electric wire and a core wire protecting portion provided so as to extend from one end of the electric wire grasping portion is attached, the core wire protecting portion includes a base on which the insulating covering portion is placed and a welded piece which is provided so as to extend from the base and disposed near the core wire exposed from the insulating covering portion, and the welded piece is welded to one face of the conductive metal plate along with the exposed core wire.

As described above, in the connection structure of an electric wire of the present invention, on the end side of the covered electric wire, the auxiliary terminal including the electric wire grasping portion which grasps the insulating covering portion of the covered electric wire and the welded piece disposed near the exposed core wire is attached. Moreover, in the connection structure of an electric wire of the present invention, the welded piece is welded to the conductive metal plate along with the exposed core wire. With this configuration, compared to "a connection structure of an electric wire, in which only a core wire exposed from an insulating covering portion is welded to a bus bar" like the above-described existing technique, it is possible to connect the covered electric wire to a conductive connecting member such as a bus bar more firmly.

Moreover, since the present invention connects "the core wire of the covered electric wire" and "the welded piece of the auxiliary terminal" to the conductive metal plate by welding, there is no possibility of a substantial increase in time and trouble needed to perform a connecting operation as in a method of connecting an electric wire by using a bolt and a nut.

Moreover, it is desirable that the welded piece is formed of a pair of plate-like pieces provided so as to extend from the right and left sides at one end of the base toward one side, and the pair of plate-like pieces is disposed on the right and left sides of the exposed core wire.

As described above, in the present invention, the welded piece which is welded to one face of the conductive metal plate along with the exposed core wire is disposed on the right and left sides of the core wire. With this configuration, compared to "a connection structure of an electric wire, in which only a core wire exposed from an insulating covering portion is welded to a bus bar" like the above-described existing technique, it is possible to reduce a force which is exerted on the welds of the core wire of the covered electric wire and the bus bar, which reduces the possibility that the core wire welded to the bus bar becomes detached from the bus bar.

Furthermore, the present invention is directed to a connection structure of an electric wire, the connection structure which connects a core wire exposed, on the end side of a covered electric wire with an insulating covering portion covering the outer periphery of the core wire, from the insulating covering portion to a conductive metal plate, wherein, on the end side of the covered electric wire, an auxiliary terminal including an electric wire grasping portion which grasps the insulating covering portion of the covered electric wire and a core wire protecting portion provided so as to extend from one end of the electric wire grasping portion is attached, the core wire protecting portion includes a plate-like welded piece which is provided so as to extend from the electric wire grasping portion, in the welded piece, a core wire protective hole into which the exposed core wire is inserted and disposed is formed, and the welded piece is welded to one face of the conductive metal plate along with the exposed core wire.

Moreover, it is desirable that the welded piece has a standing piece formed at the front end thereof, the standing piece which bends at almost a right angle and extends in a direction perpendicular to the conductive metal plate.

As described above, the connection structure of an electric wire of the present invention adopts a structure in which the welded piece of the auxiliary terminal which grasps the end side of the covered electric wire is welded to one face of the conductive metal plate such as a bus bar along with the core wire exposed from the insulating covering portion of the covered electric wire. Moreover, in the welded piece, the core wire protective hole into which the exposed core wire is inserted and disposed is formed. With this configuration, the periphery of the exposed core wire is surrounded with the welded piece. That is, in the present invention, the welded piece surrounding the periphery of the core wire is welded to the conductive metal plate along with the core wire exposed on the end side of the covered electric wire.

With this configuration, compared to "a connection structure of an electric wire, in which only a core wire exposed from an insulating covering portion is welded to a bus bar" like the above-described existing technique, it is possible to connect the covered electric wire to the conductive metal plate more firmly. Furthermore, with this configuration, it is possible to reduce a force which is exerted on the welds of the core wire of the covered electric wire and the conductive metal plate, which reduces the possibility that the core wire welded to the conductive metal plate becomes detached from the conductive metal plate.

Moreover, it is desirable that, in the core wire protecting portion, a back-side welded piece which is welded to the side of the conductive metal plate where the other face thereof is located is formed, and the conductive metal plate is sandwiched between the welded piece and the back-side welded piece.

As indicated in this configuration, since welding is performed in a state in which the front and back sides (the upper and lower faces) of the conductive metal plate are sandwiched between the welded piece and the back-side welded piece of the auxiliary terminal, compared to the above-described existing technique, the possibility that the welds of the core wire and the conductive metal plate become detached from each other is reduced. Furthermore, with this configuration, before the core wire and the conductive metal plate are welded together, temporary fixation can be performed by sandwiching the front and back sides of the conductive metal plate between the welded piece and the back-side welded piece of the auxiliary terminal. As a result, with this configuration, it is possible to perform positioning of the auxiliary terminal on the conductive metal plate with ease. Moreover, there is no need for a jig for positioning and a jig for correcting a position. That is, with this configuration, since the above-described temporary fixation can be performed, the workability of a welding operation is improved.

Furthermore, it is desirable that the thickness of the core wire which is welded to one face of the conductive metal plate is nearly equal to the thickness of the welded piece which is welded to the one face and the sides of the core wire are in contact with the welded piece.

With this configuration, it is possible to form "the core wire and the welded piece" which are welded to the conductive metal plate into an integrated shape, which makes it possible to improve the flexural capacity of the welding boundary surface of the core wire which is physically weak.

Moreover, the present invention is directed to an auxiliary terminal that is used to connect a core wire exposed, on the end side of a covered electric wire with an insulating covering portion covering the outer periphery of the core wire, from the insulating covering portion to a conductive metal plate, the auxiliary terminal including: an electric wire grasping portion that grasps the insulating covering portion of the covered electric wire; and a core wire protecting portion provided so as to extend from one end of the electric wire grasping portion, wherein the electric wire grasping portion includes a bottom face portion on which the insulating covering portion of the covered electric wire is placed, and, on both sides of the bottom face portion, a grasping piece which grasps the covered electric wire by being wound around the insulating covering portion is formed, the core wire protecting portion is formed roughly in the shape of a fork having a plate-like base which is provided so as to extend from the bottom face portion of the electric wire grasping portion and a pair of welded pieces provided so as to extend from the right and left sides at one end of the base toward one side, a void portion formed between one of the welded pieces and the other of the welded pieces becomes a core wire protective groove, and the end side of the insulating covering portion of the covered electric wire is placed on the bottom face portion and the base, when the insulating covering portion is grasped by the grasping piece, the exposed core wire is disposed in the position of the core wire protective groove, and the welded pieces are welded to one face of the conductive metal plate along with the exposed core wire.

With the auxiliary terminal of the present invention, when the insulating covering portion of the covered electric wire is grasped by the grasping piece, the exposed core wire of the covered electric wire can be disposed in the position of the core wire protective groove formed between the pair of welded pieces. Furthermore, with the auxiliary terminal of the present invention, it is possible to weld the pair of welded pieces to the conductive metal plate such as a bus bar along with the exposed core wire of the covered electric wire which is disposed in the position of the core wire protective groove. As a result, according to the present invention, by using the auxiliary terminal of the present invention to connect the conductive metal plate and the covered electric wire, it is possible to connect the covered electric wire to the conductive connecting member firmly.

In addition, the present invention is directed to an auxiliary terminal that is used to connect a core wire exposed, on the end side of a covered electric wire with an insulating covering portion covering the outer periphery of the core wire, from the insulating covering portion to a conductive metal plate, the auxiliary terminal including: an electric wire grasping portion that grasps the insulating covering portion of the covered electric wire; and a core wire protecting portion provided so as to extend from one end of the electric wire grasping portion, wherein the electric wire grasping portion includes a bottom face portion on which the insulating covering portion of the covered electric wire is placed, and, on both sides of the bottom face portion, a grasping piece which grasps the covered electric wire by being wound around the insulating covering portion is formed, the core wire protecting portion is formed of a plate-like welded piece which is provided so as to extend from the bottom face portion of the electric wire grasping portion, in the welded piece, a core wire protective hole into which the exposed core wire is inserted and disposed is formed, and the end side of the insulating covering portion of the covered electric wire is placed on the bottom face portion, when the insulating covering portion is grasped by the grasping piece, the exposed core wire is disposed in the core wire protective hole, and the welded piece is welded to one face of the conductive metal plate along with the exposed core wire.

With the auxiliary terminal of the present invention, when the insulating covering portion of the covered electric wire is grasped by the grasping piece, the exposed core wire of the covered electric wire can be disposed in the core wire protective hole formed in the welded piece. Moreover, with the auxiliary terminal of the present invention, it is possible to weld the welded piece to the conductive metal plate such as a bus bar along with the exposed core wire of the covered electric wire which is disposed in the core wire protective groove. As a result, according to the present invention, by using the auxiliary terminal of the present invention to connect the conductive metal plate and the covered electric wire, it is possible to connect the covered electric wire to the conductive connecting member firmly.

Advantageous Effects of Invention

According to the present invention, it is possible to provide a connection structure of an electric wire, the connection structure that can firmly connect an electric wire to a conductive metal plate without greatly increasing a burden of a connecting operation, and an auxiliary terminal for connecting an electric wire to a conductive metal plate.

BRIEF DESCRIPTION OF DRAWINGS

FIG. 15 is a schematic diagram showing a plan view of the connection structure of an electric wire of the second embodiment of the present invention.

FIG. 16 is a schematic diagram showing a side view of the connection structure of an electric wire of the second embodiment of the present invention.

FIG. 25 is a schematic diagram of a connection structure of an electric wire of a third embodiment of the present invention, which is viewed obliquely from above.

FIG. 26 is a schematic diagram showing a plan view of the connection structure of an electric wire of the third embodiment of the present invention.

DESCRIPTION OF EMBODIMENTS

Figure 1:
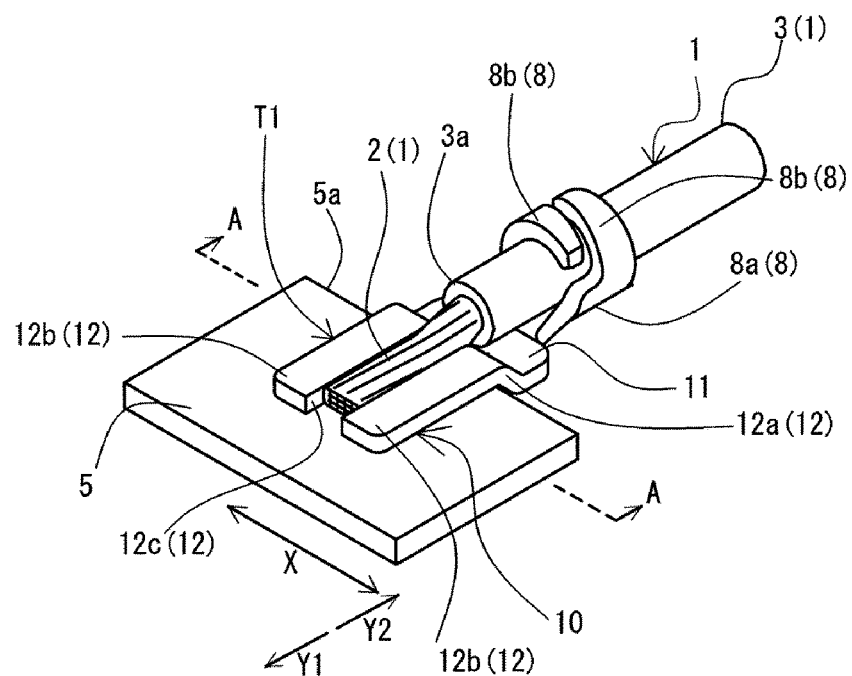
FIG. 1 is a schematic diagram of a connection structure of an electric wire of a first embodiment of the present invention, which is viewed obliquely from above.

Hereinafter, the configurations of connection structures of an electric wire of embodiments (first to fourth embodiments) of the present invention and auxiliary terminals which are used in these connection structures will be described.

It is to be noted that the connection structures of an electric wire of the present embodiments (the first to fourth embodiments) can be used for various purposes; hereinafter, descriptions will be given by taking up, as an example, a case in which the connection structure is used for connection of a bus bar, which is connected to an electrode post of a battery cell of a battery for vehicles with a battery module configured with a plurality of stacked battery cells, with a voltage detecting wire (a covered electric wire).

First Embodiment

First, the schematic configuration of the connection structure of an electric wire of the first embodiment will be described with reference to FIGS. 1 to 4.

As depicted in FIGS. 1 to 4, the connection structure of an electric wire of the first embodiment has a configuration in which an auxiliary terminal T1 is attached to a covered electric wire 1 from which a core wire 2 is exposed and the auxiliary terminal T1 is welded to a bus bar 5 along with the exposed core wire 2.

The above-described bus bar 5 is configured with a conductive metal plate formed in the shape of a flat plate, and a bus bar made of copper or aluminum, for example, is used.

Moreover, the covered electric wire 1 has the core wire 2 formed of copper wires or aluminum wires and an insulating covering portion 3 covering the outer periphery of the core wire 2. It is to be noted that the insulating covering portion 3 is formed of an insulating material such as rubber.

Moreover, the auxiliary terminal T1 is formed of a metal material such as a copper alloy.

Specifically, in the connection structure of an electric wire of the first embodiment, the core wire 2 is exposed by removing (stripping off) the insulating covering portion 3 on the end side of the covered electric wire 1, and the auxiliary terminal T1 is attached on the end side of the covered electric wire 1. This auxiliary terminal T1 includes an electric wire grasping portion 8 that grasps the insulating covering portion 3 on the end side of the covered electric wire 1 and a core wire protecting portion 10 provided so as to extend from one end of the electric wire grasping portion 8.

Moreover, the above-described core wire protecting portion 10 has a base 11 on which an end 3a of the insulating covering portion 3 is placed and welded pieces (a pair of welded pieces 12 and 12 and a welded piece (a back-side welded piece) 13) which are provided so as to extend from the base 11 toward the front and disposed near the exposed core wire 2.

The above-described connection structure of an electric wire has a configuration in which, in a state in which the auxiliary terminal T1 is attached to the covered electric wire 1, the welded pieces 12 and 12 of the auxiliary terminal T1 are welded to one face (the front side) of the bus bar 5 along with the exposed core wire 2. Moreover, the connection structure of an electric wire of the first embodiment has a configuration in which the welded piece 13 is welded to the other face (the back side) of the bus bar 5.

It is to be noted that, for welding, welding means such as resistance welding, fiber laser welding, and ultrasonic welding are used.

As described above, in the first embodiment, on the end side of the covered electric wire 1, the auxiliary terminal T1 is attached in a state in which the auxiliary terminal T1 grasps (holds) the insulating covering portion 3. Moreover, in the first embodiment, the pair of welded pieces 12 and 12, which is disposed near the core wire 2, of the auxiliary terminal T1 is welded to one face (the front side) of the bus bar 5 along with the core wire 2 exposed on the end side of the covered electric wire 1.

With this configuration, compared to "a connection structure of an electric wire, in which only a core wire exposed from an insulating covering portion is welded to a bus bar" like the above-described existing technique, it is possible to connect the covered electric wire 1 to the bus bar 5 more firmly. Moreover, with this configuration, it is possible to reduce a force which is exerted on the welds of the core wire 2 of the covered electric wire 1 and the bus bar 5, which reduces the possibility that the core wire 2 welded to the bus bar 5 becomes detached from the bus bar 5.

Furthermore, in the connection structure of an electric wire of the first embodiment, the welded piece 13 of the auxiliary terminal T1 is welded to the other face (the back side) of the bus bar 5. That is, in the first embodiment, welding is performed in a state in which the front and back sides of the bus bar 5 are sandwiched between the welded pieces 12 and 12 and the welded piece 13 of the auxiliary terminal T1. As a result, according to the first embodiment, compared to the above-described existing technique, the possibility that the welds of the core wire 2 and the bus bar 5 become detached from each other is reduced.

Next, the configuration of the auxiliary terminal T1 of the first embodiment will be described with reference to FIGS. 1 to 4, which have been described above, and FIGS. 5 to 8.

Figure 5:
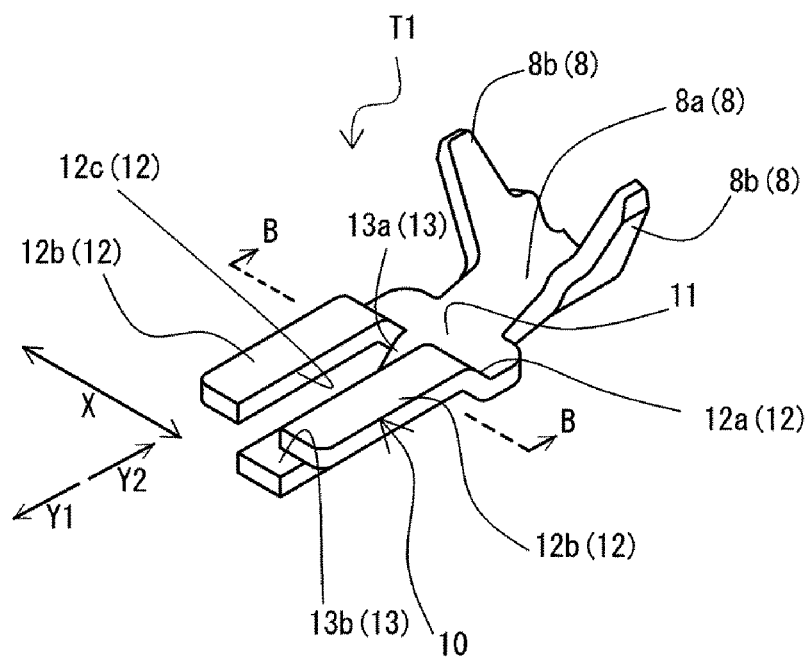
FIG. 5 is a schematic diagram of an auxiliary terminal viewed obliquely from above, which is used in the connection structure of an electric wire of the first embodiment of the present invention.
Figure 6:
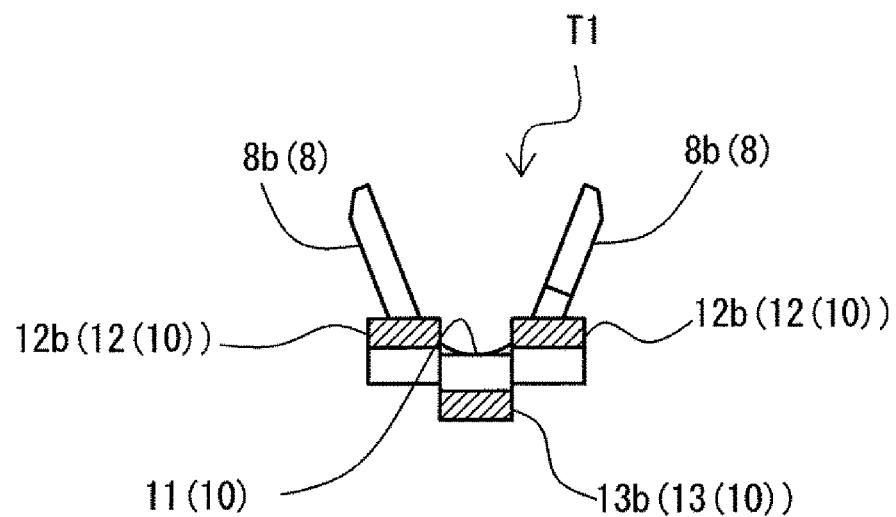
FIG. 6 is a schematic diagram depicting a cross section taken along the line B-B of FIG. 5.
Figure 7:
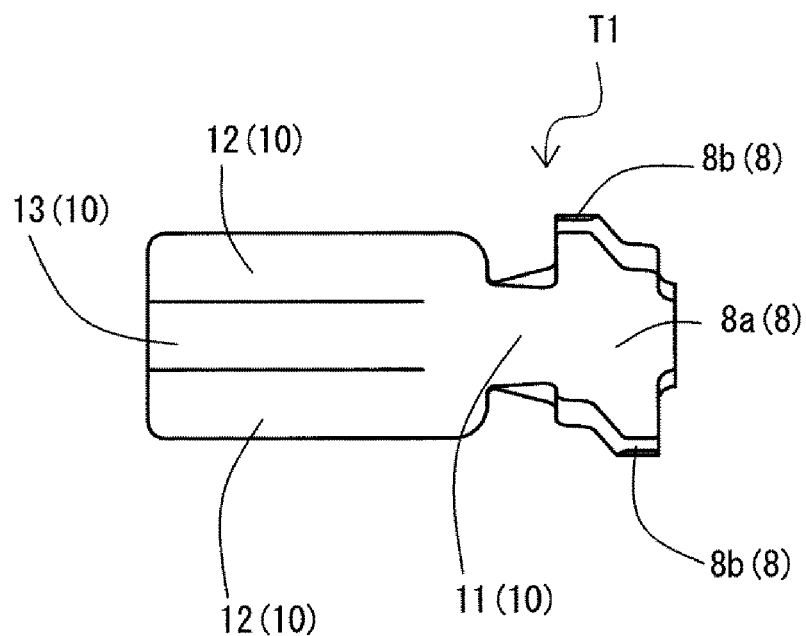
FIG. 7 is a schematic diagram showing a plan view of the auxiliary terminal which is used in the connection structure of an electric wire of the first embodiment of the present invention.
Figure 8:
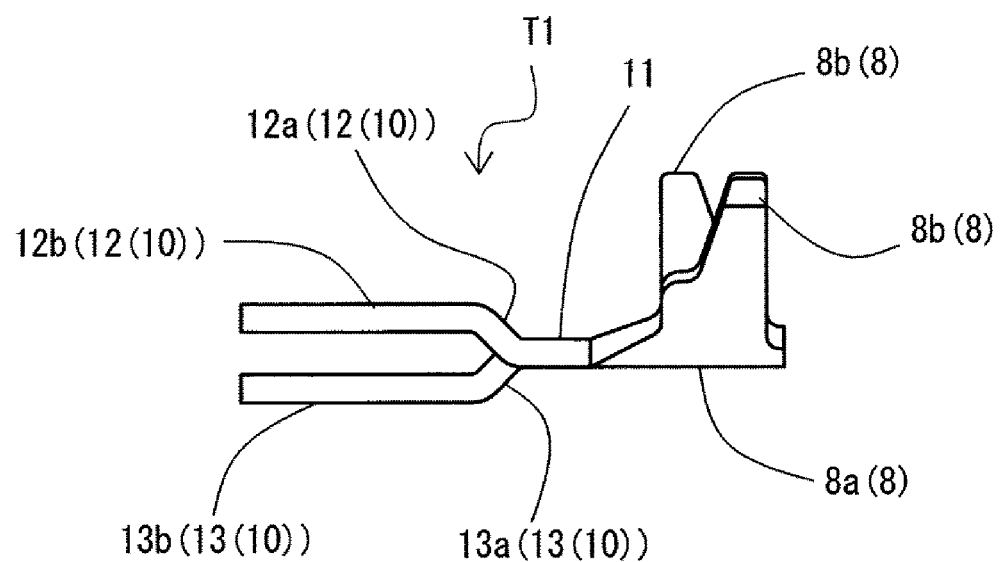
FIG. 8 is a schematic diagram showing a side view of the auxiliary terminal which is used in the connection structure of an electric wire of the first embodiment of the present invention.

It is to be noted that FIG. 5 is a schematic diagram of the auxiliary terminal viewed obliquely from above, which is used in the connection structure of an electric wire of the first embodiment. FIG. 6 is a schematic diagram depicting a cross section taken along the line B-B of FIG. 5. FIG. 7 is a schematic diagram showing a plan view of the auxiliary terminal which is used in the connection structure of an electric wire of the first embodiment. FIG. 8 is a schematic diagram showing a side view of the auxiliary terminal which is used in the connection structure of an electric wire of the first embodiment.

As depicted in FIGS. 5 to 8, the auxiliary terminal T1 includes the electric wire grasping portion 8 that grasps the insulating covering portion 3 of the covered electric wire 1 and the core wire protecting portion 10 provided so as to extend from one end (the front end) of the electric wire grasping portion 8.

The above-described electric wire grasping portion 8 has a plate-like bottom face portion 8a on which the insulating covering portion 3 of the covered electric wire 1 is placed. Moreover, on the right and left sides of the bottom face portion 8a, grasping pieces 8b and 8b for grasping the covered electric wire 1 by being wound around the insulating covering portion 3 are formed.

Furthermore, the core wire protecting portion 10 has the plate-like base 11 which is provided so as to extend from the bottom face portion 8a of the electric wire grasping portion 8, the pair of welded pieces 12 and 12 provided so as to extend from the right and left sides at one end (the front end) of the base 11 toward one side (a Y1 direction (see FIG. 5)), and the welded piece (the back-side welded piece) 13 provided so as to extend from a central part (a central part in a lateral direction (an X direction)) at one end (the front end) of the base 11 toward one side (the Y1 direction).

The above-described welded piece 12 is formed in the shape of a rectangular long plate when viewed in a plan view and has an oblique piece portion 12a which extends obliquely upward from the base 11 toward the front (the Y1 direction) and a horizontal piece portion 12b which bends at the tip of the oblique piece portion 12a in a direction parallel to the base 11 and extends toward the front.

Moreover, the pair of welded pieces 12 and 12 is disposed so that the welded pieces 12 and 12 are arranged in parallel in such a way as to be separated from each other with a predetermined space left therebetween. Furthermore, a void portion formed between one welded piece 12 and the other welded piece 12 becomes a core wire protective groove 12c. Then, when the auxiliary terminal T1 is attached to the covered electric wire 1, the core wire 2 exposed on the end side of the covered electric wire 1 is disposed in the position of this core wire protective groove 12c (see FIGS. 1 to 3).

Figure 2:
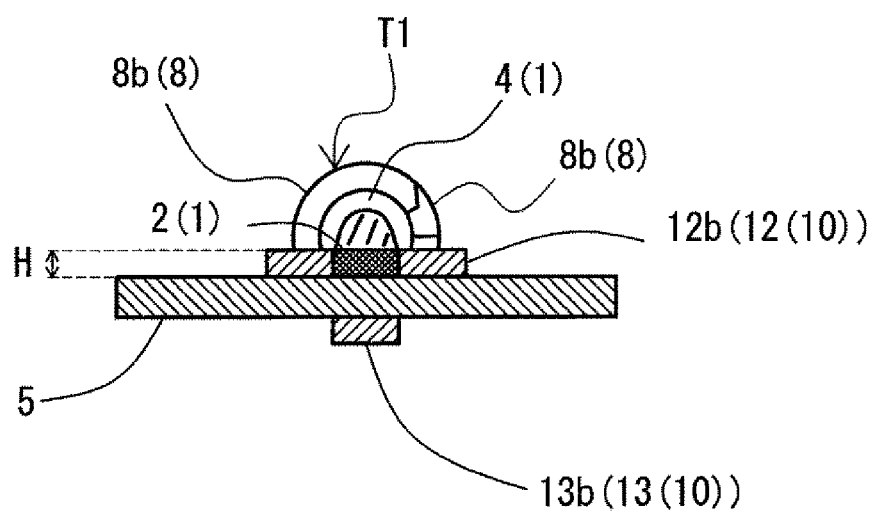
FIG. 2 is a schematic diagram depicting a cross section taken along the line A-A of FIG. 1.
Figure 3:
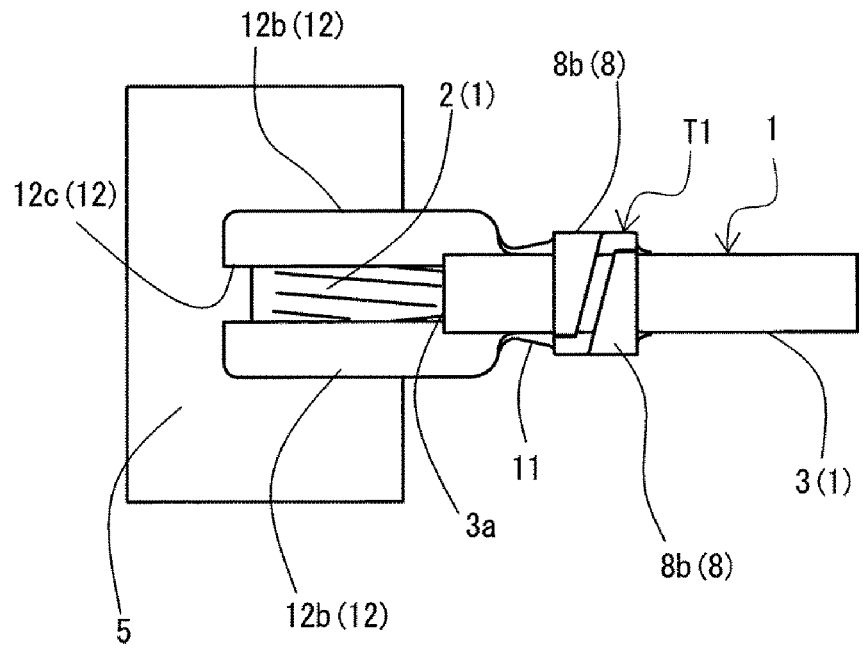
FIG. 3 is a schematic diagram showing a plan view of the connection structure of an electric wire of the first embodiment of the present invention of the present invention.
Figure 4:
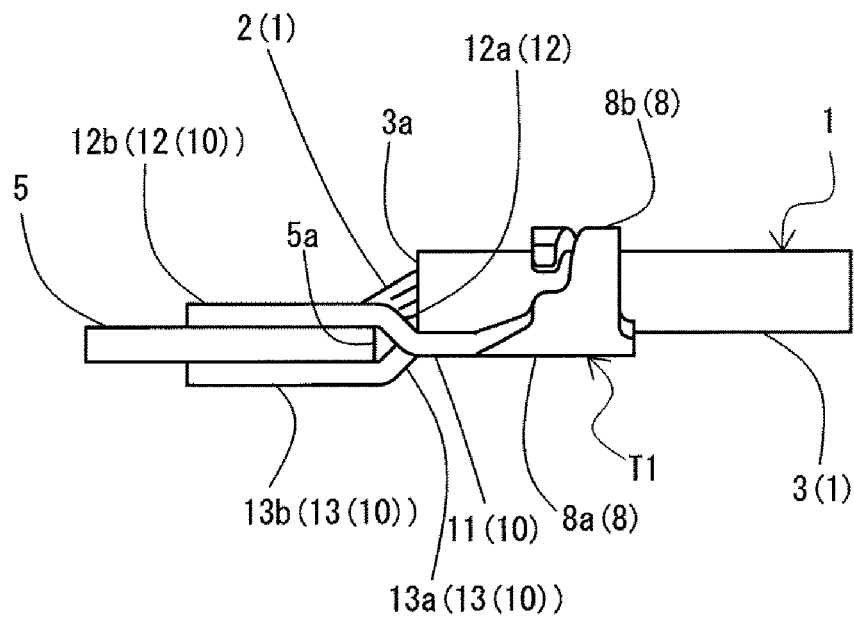
FIG. 4 is a schematic diagram showing a side view of the connection structure of an electric wire of the first embodiment of the present invention of the present invention.

It is to be noted that the width of the core wire protective groove 12c (the size thereof in a transverse direction (the X direction)) is designed so as to be a size greater than the diameter of the core wire 2 which is not welded to the bus bar 5 (see FIGS. 9 and 10), the size that brings, when the core wire 2 is welded to the bus bar 5, the sides of the welded core wire 2 into contact with the core wire protective groove 12c (see FIGS. 1 and 2). Moreover, the length of the core wire protective groove 12c (the size thereof in a longitudinal direction) is designed so as to be a size greater than the core wire exposed from the insulating covering portion 3 by a predetermined size (for example, a few millimeters).

Furthermore, the above-described welded piece 13 is formed in the shape of a rectangular long plate when viewed in a plan view and has an oblique piece portion 13a which extends obliquely downward from the base 11 toward the front (the Y1 direction (see FIG. 5)) and a horizontal piece portion 13b which bends at the tip of the oblique piece portion 13a in a direction parallel to the base 11 and extends toward the front. It is to be noted that the welded piece 13 is disposed below the core wire protective groove 12c.

Moreover, in the welded piece 13, the horizontal piece portion 13b is disposed below the horizontal piece portion 12b of the welded piece 12 by an amount corresponding to the thickness of the bus bar 5. Then, by inserting the bus bar 5 between the upper face of the horizontal piece portion 13b of the welded piece 13 and the lower face of the horizontal piece portion 12b of the welded piece 12, the bus bar 5 is sandwiched between "the horizontal piece portion 13b of the welded piece 13" and "the horizontal piece portion 12b of the welded piece 12" (see FIGS. 2 and 4).

Furthermore, as described earlier, the electric wire grasping portion 8 includes the bottom face portion 8a and the pair of grasping pieces 8b and 8b formed on the right and left sides of the bottom face portion 8a, and is formed roughly in the shape of the letter U when viewed in cross section. Moreover, the pair of grasping pieces 8b and 8b is provided so as to be extend in directions in which the grasping pieces 8b and 8b get away from each other, in the directions of the outside of the bottom face portion 8a from the right and left sides of the bottom face portion 8a and obliquely upward.

Next, a procedure by which the auxiliary terminal T1 is attached to the covered electric wire 1 will be described.

When the auxiliary terminal T1 is attached to the covered electric wire 1, first, the core wire 2 is exposed by removing the insulating covering portion 3 on the end side of the covered electric wire 1. Next, the end 3a of the insulating covering portion 3 of the covered electric wire 1, from which the core wire 2 is exposed, is positioned and placed on the front end of the upper face of the base 11 of the core wire protecting portion 10 of the auxiliary terminal T1. As a result, the insulating covering portion 3 is placed on the base 11 and the bottom face portion 8a of the electric wire grasping portion 8. Furthermore, the core wire 2 exposed from the insulating covering portion 3 is disposed in the position of the core wire protective groove 12c formed between the pair of welded pieces 12 and 12.

Then, the grasping pieces 8b and 8b of the electric wire grasping portion 8 are wound around the outer peripheral part of the insulating covering portion 3, which is placed on the base 11 and the bottom face portion 8a of the electric wire grasping portion 8, and fastened (crimped) thereonto. By this process, the auxiliary terminal T1 is attached to the covered electric wire 1.

Next, a process of welding, to the bus bar 5, the covered electric wire 1 to which the auxiliary terminal T1 is attached will be described with reference to FIGS. 1 to 4, which have been described above, and FIGS. 9 to 12.

Figure 9:
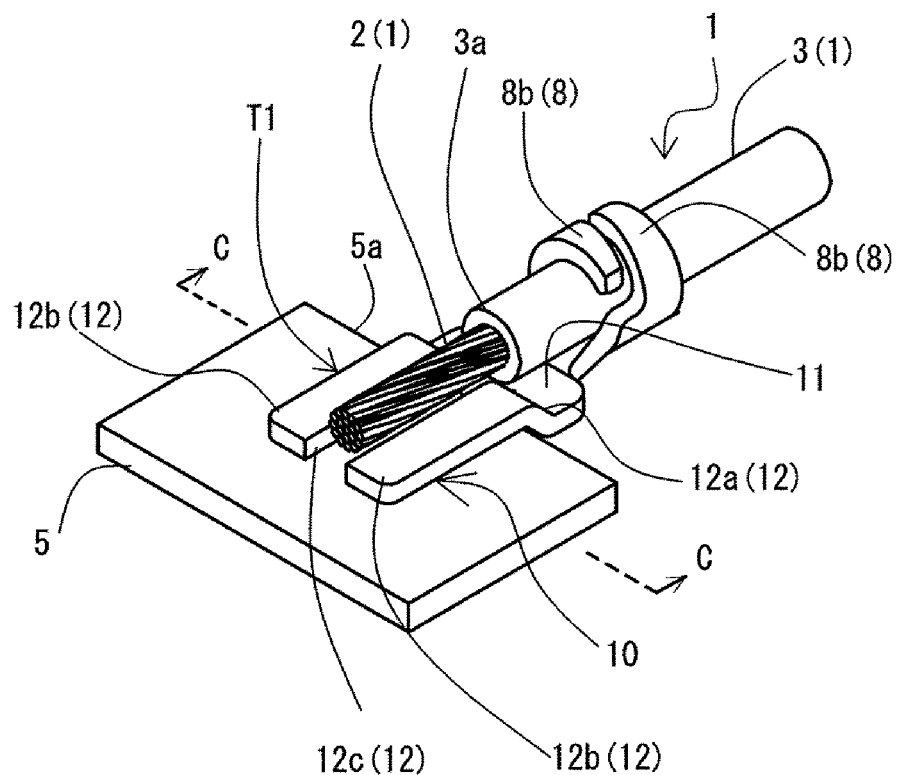
FIG. 9 is a schematic diagram for explaining a connecting process of the connection structure of an electric wire of the first embodiment of the present invention.
Figure 10:
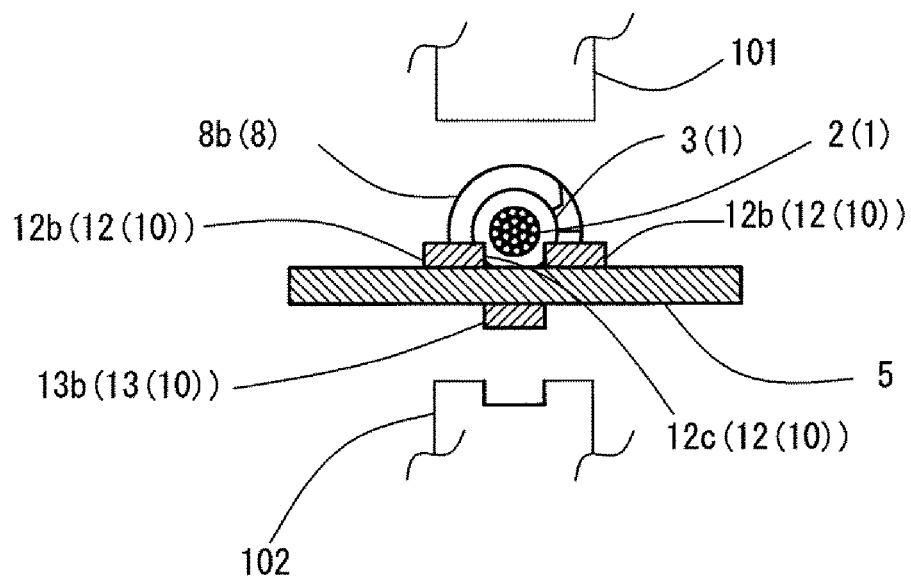
FIG. 10 is a schematic diagram showing a sectional view taken along the line C-C of FIG. 9 and electrodes for welding.
Figure 11:
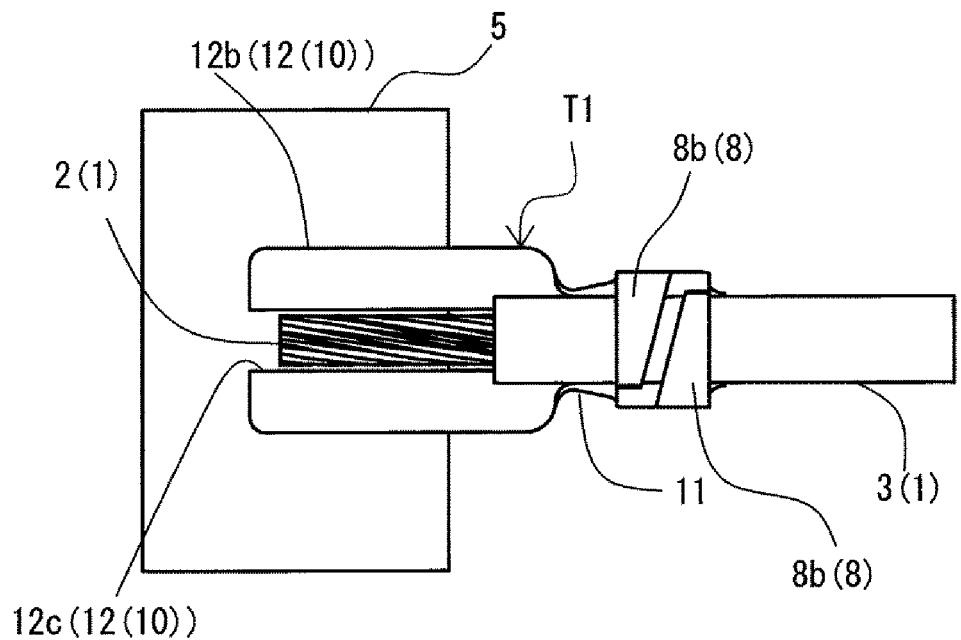
FIG. 11 is a schematic diagram for explaining the connecting process of the connection structure of an electric wire of the first embodiment of the present invention.
Figure 12:
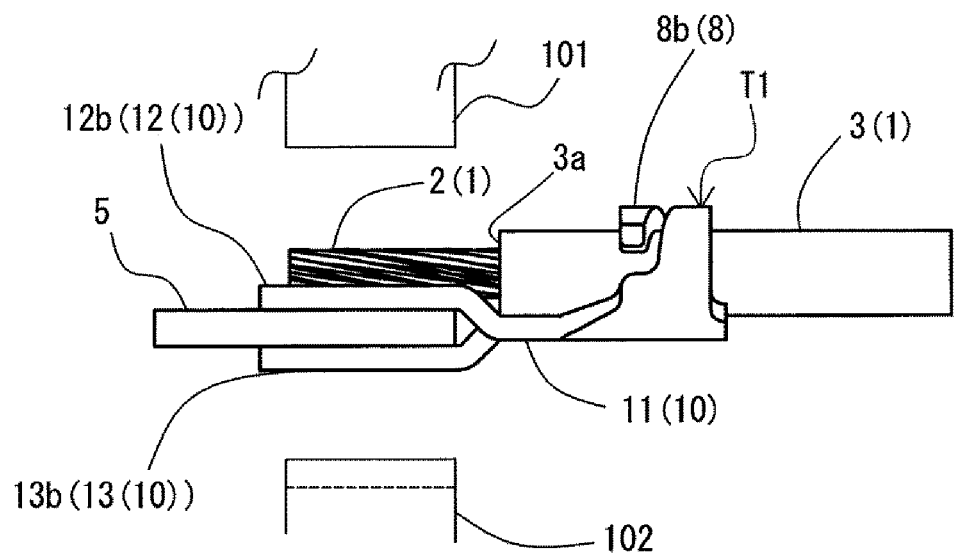
FIG. 12 is a schematic diagram for explaining the connecting process of the connection structure of an electric wire of the first embodiment of the present invention.

It is to be noted that FIG. 9 is a schematic diagram for explaining a connecting process of the connection structure of an electric wire of the first embodiment, the schematic diagram showing a pre-welding state, which is viewed obliquely from above, in which the auxiliary terminal is attached on the end side of the covered electric wire from which the core wire is exposed and the core wire and the auxiliary terminal are positioned on the bus bar. FIG. 10 is a schematic diagram showing a sectional view taken along the line C-C of FIG. 9 and electrodes for welding. FIG. 11 is a schematic diagram for explaining the connecting process of the connection structure of an electric wire of the first embodiment, the schematic diagram showing a plan view of the pre-welding state in which the auxiliary terminal is attached on the end side of the covered electric wire from which the core wire is exposed and the core wire and the auxiliary terminal are positioned on the bus bar. FIG. 12 is a schematic diagram for explaining the connecting process of the connection structure of an electric wire of the first embodiment, the schematic diagram showing a side view of the pre-welding state in which the auxiliary terminal is attached on the end side of the covered electric wire from which the core wire is exposed and the core wire and the auxiliary terminal are positioned on the bus bar.

In a process of welding, to the bus bar, the covered electric wire 1 to which the auxiliary terminal T1 is attached, first, as depicted in FIGS. 9 and 11, in a predetermined welding position of the bus bar 5, the covered electric wire 1 to which the auxiliary terminal T1 is attached is set.

Specifically, the covered electric wire 1 to which the auxiliary terminal T1 is attached is prepared, and an end 5a of the bus bar 5 is inserted between the lower faces of the welded pieces 12 of the auxiliary terminal T1 and the upper face of the welded piece 13 and pushed until the end 5a of the bus bar 5 is disposed in the position of the tip of the oblique piece portion 12a of each welded piece 12. Moreover, the core wire 2 exposed on the end side of the covered electric wire 1 is positioned and disposed in the position of the core wire protective groove 12c formed between "the pair of welded pieces 12 and 12" of the auxiliary terminal T1 and is set in the state shown in FIG. 9. As a result, "the welded pieces 12 of the auxiliary terminal T1" and "the exposed core wire 2 of the covered electric wire 1" are disposed on the upper-face side of the bus bar 5, and "the welded piece 13 of the auxiliary terminal T1" is disposed on the lower-face side of the bus bar 5. Furthermore, the bus bar 5 is sandwiched between "the welded pieces 12 of the auxiliary terminal T1" and "the welded piece 13 of the auxiliary terminal T1".

Next, as depicted in FIGS. 10 and 12, above the upper face of the bus bar 5 on which the covered electric wire 1 to which the auxiliary terminal T1 is attached is set, an upper electrode 101 for welding is disposed, and, below the lower face of the bus bar 5, a lower electrode 102 for welding is disposed. It is to be noted that the upper electrode 101 and the electrode 102 are disposed so as to face each other. Then, after "the lower face of the bus bar 5" and "the welded piece 13 of the auxiliary terminal T1" are placed on the lower electrode 102, the upper electrode 101 is moved downward and pressed against (brought into contact with) "the exposed core wire 2" and "the welded pieces 12 of the auxiliary terminal T1", which are ultrasonically vibrated while being pressurized by the upper electrode 101. As a result, the welded pieces 12 and 12 of the auxiliary terminal T1 are welded to one face (the front side) of the bus bar 5 along with the exposed core wire 2 and the welded piece 13 is welded to the other face (the back side) of the bus bar 5, whereby the state shown in FIGS. 1 to 4 is obtained.

Moreover, as depicted in FIG. 2, the core wire 2 welded to the upper face of the bus bar 5 has, in the core wire protective groove 12c formed between the pair of welded pieces 12 and 12 disposed on both sides of the core wire 2, a rectangular cross-sectional shape similar to the cross-sectional shape of the welded piece 12. Furthermore, the side faces of the core wire 2 welded to the upper face of the bus bar 5 are in contact with the pair of welded pieces 12 and 12.

As described above, in the first embodiment, by attaching the auxiliary terminal T1 to the covered electric wire 1 from which the core wire 2 is exposed and disposing "the pair of welded pieces 12 and 12 of the auxiliary terminal T1" and "the exposed core wire 2" on the upper-face side of the bus bar 5 and, in this state, ultrasonically vibrating "the pair of welded pieces 12 and 12 of the auxiliary terminal T1" and "the exposed core wire 2" which are sandwiched between the upper electrode 101 and the lower electrode 102, "the pair of welded pieces 12 and 12" and "the exposed core wire 2" are welded to the bus bar 5. That is, since the first embodiment is a method by which the covered electric wire 1 is connected to the bus bar 5 by welding, there is no possibility of a substantial increase in time and trouble needed to perform a connecting operation as in a method of connecting an electric wire by using a bolt and a nut.

Moreover, in the first embodiment, the auxiliary terminal T1 is welded to the bus bar 5 along with the core wire 2 exposed from the insulating covering portion 3 in a state in which the auxiliary terminal T1 grasps (holds) the insulating covering portion 3 on the end side of the covered electric wire 1. With this configuration, compared to "a connection structure of an electric wire, in which only a core wire exposed from an insulating covering portion is welded to a bus bar" like the above-described existing technique, it is possible to greatly reduce a force which is exerted on the welds of the core wire 2 of the covered electric wire 1 and the bus bar 5, which reduces the possibility that the core wire 2 welded to the bus bar 5 becomes detached from the bus bar 5.

Furthermore, in the first embodiment, in the process of welding the core wire 2 to the bus bar 5, in a state in which the pair of welded pieces 12 and 12 is disposed on the right and left sides of the exposed core wire 2, the core wire 2 and the welded pieces 12 and 12 are ultrasonically vibrated while being pressurized by the upper electrode 101 pressed against them from above. As a result, "the exposed core wire 2" is compressed to the thickness of "the pair of welded pieces 12 and 12" and the work height H (the height of a welding cross-section (see FIG. 2)) of the core wire 2 is reduced. Moreover, in the first embodiment, since the work height H of the core wire 2 is set so as to be the same as the height of "the pair of welded pieces 12 and 12", "the exposed core wire 2" and "the pair of welded pieces 12 and 12" have the stable shape of an integrated rectangular parallelepiped. As a result, an improvement in the flexural capacity of the welding boundary surface of the core wire 2 which is physically weak and an improvement in tensile strength including the insulating covering portion 3 are achieved.

It is to be noted that a shape which is obtained when "the exposed core wire 2" and "the pair of welded pieces 12 and 12" are integrally formed is not limited to the shape of a rectangular parallelepiped described above. A shape which is obtained when "the exposed core wire 2" and "the pair of welded pieces 12 and 12" are integrally formed may be, for example, a cross-sectional shape of an inverted trapezoid; in this case, a situation in which the core wire 2 spreads out and falls out of the core wire protective groove 12c is prevented.

Moreover, with the configuration of the first embodiment, before the core wire 2 and the bus bar 5 are welded together, temporary fixation can be performed by sandwiching the front and back sides of the bus bar 5 on the side of the end 5a thereof between "the pair of welded pieces 12 and 12" and "the welded piece 13" of the auxiliary terminal T1.

As a result, according to the first embodiment, it is possible to perform positioning of the core wire 2 on the bus bar 5 with ease. Furthermore, there is no need for a jig for positioning and a jig for correcting a position. In addition, as described above, since temporary fixation can be performed, the bus bar 5 and the core wire 2 can be easily set on the lower electrode 102 before welding, which improves the workability of a welding operation.

Moreover, in the first embodiment, since a configuration in which the core wire 2 of the covered electric wire 1, which is a voltage detecting wire, is directly connected to the bus bar 5 is adopted, it is possible to obtain a voltage detection signal directly from an electrode post of a battery cell in the shortest distance and measure a potential difference with high accuracy.

Thus, with the connection structure of the first embodiment, compared to a connection structure in which the covered electric wire 1 and the bus bar 5 are connected via a connecting terminal, it is possible to perform more precise potential measurement. It is to be noted that, as the connection structure in which the covered electric wire 1 and the bus bar 5 are connected via a connecting terminal, there is, for example, "a connection structure in which a connecting terminal for connection to the bus bar 5 is prepared, the connecting terminal is connected to the tip of the core wire 2 exposed from the covered electric wire 1 by crimping, and this connecting terminal is welded to the bus bar 5". In this case, compared to the first embodiment, the number of electric resistance portions is increased, which sometimes makes it impossible to perform precise potential measurement.

As described above, with the connection structure of the first embodiment, both "the effect of obtaining a voltage detection signal with high accuracy" and "the effect of achieving firm connection of the covered electric wire 1 to the bus bar 5" can be attained.

Furthermore, in the first embodiment, since the core wire 2 is disposed between the plate-like welded pieces 12 and 12 of the auxiliary terminal T1 and welded to the bus bar 5, the pressing faces of the upper electrode 101 and the lower electrode 102 can be formed as virtually planar surfaces, which eliminates the need to provide an electrode having a special shape.

Second Embodiment

Next, the connection structure of an electric wire of the second embodiment of the present invention and the auxiliary terminal which is used in this connection structure will be described.

It is to be noted that the second embodiment uses an auxiliary terminal T2 in place of the auxiliary terminal T1 of the above-described first embodiment and the configurations of the covered electric wire 1 and the bus bar 5 are the same as those of the first embodiment. Thus, in the following description, the same components as those of the first embodiment are identified with the same reference signs and explanations thereof will be simplified (or omitted).

First, the schematic configuration of the connection structure of an electric wire of the second embodiment will be described with reference to FIGS. 13 to 16.

Figure 13:
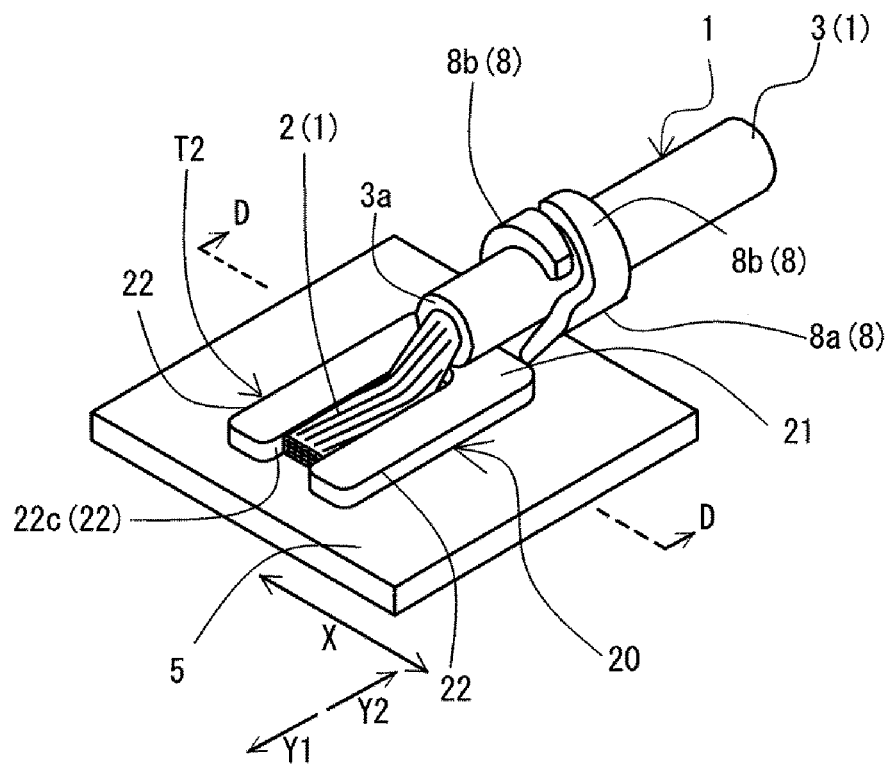
FIG. 13 is a schematic diagram of a connection structure of an electric wire of a second embodiment of the present invention, which is viewed obliquely from above.
Figure 14:
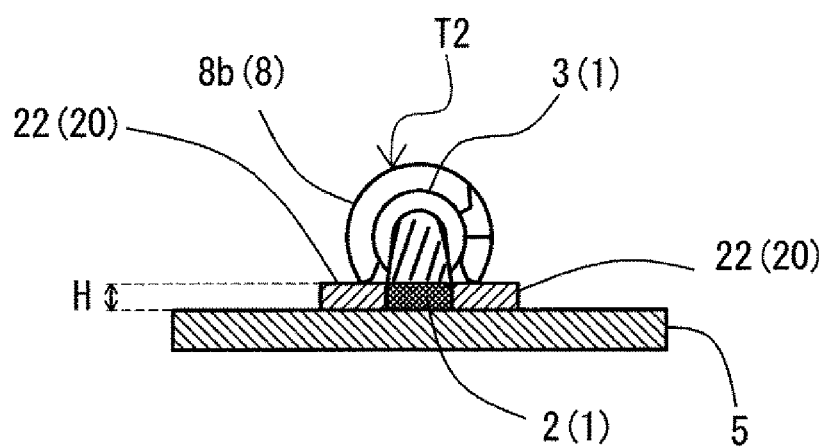
FIG. 14 is a schematic diagram depicting a cross section taken along the line D-D of FIG. 13.
Figure 1:
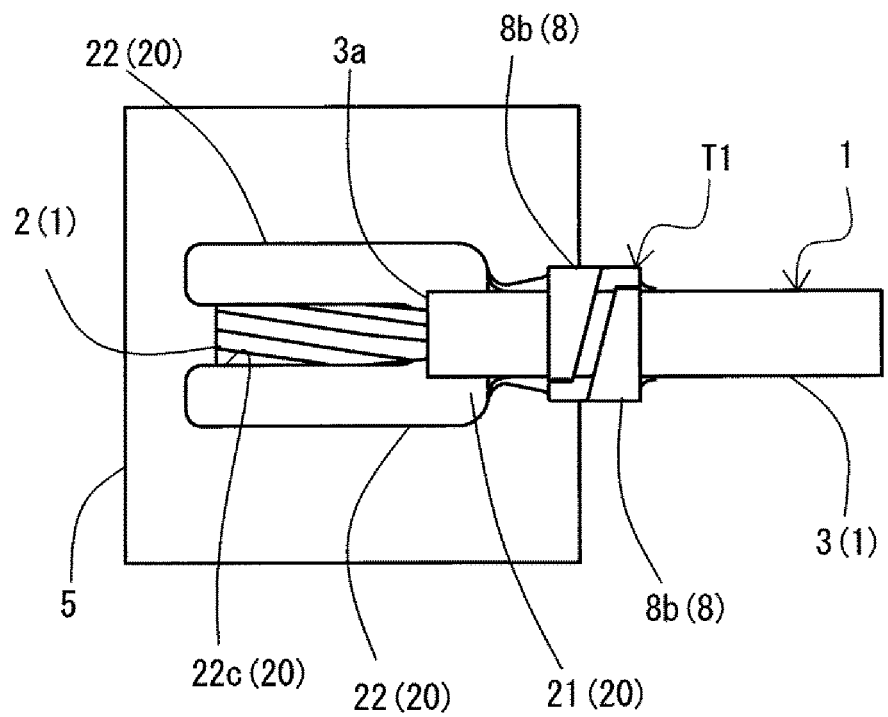
Figure 1:
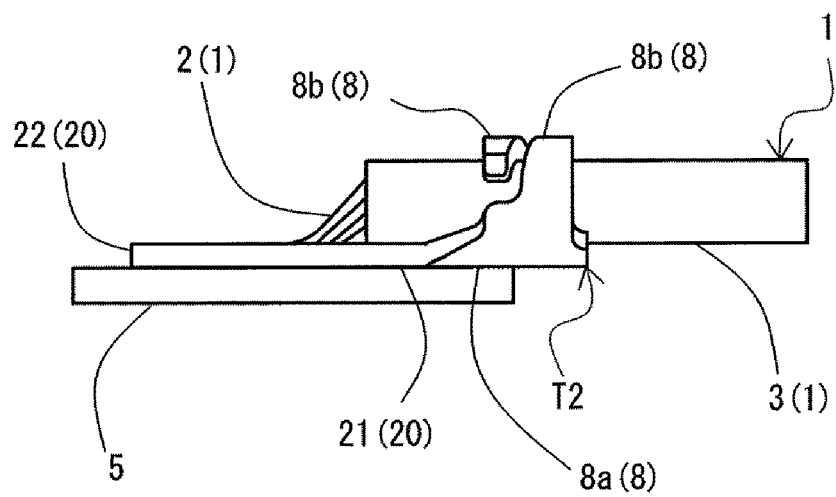

Here, FIG. 13 is a schematic diagram of the connection structure of an electric wire of the second embodiment, which is viewed obliquely from above. FIG. 14 is a schematic diagram depicting a cross section taken along the line D-D of FIG. 13. FIG. 15 is a schematic diagram showing a plan view of the connection structure of an electric wire of the second embodiment. FIG. 16 is a schematic diagram showing a side view of the connection structure of an electric wire of the second embodiment.

As depicted in FIGS. 13 to 16, in the connection structure of an electric wire of the second embodiment, the auxiliary terminal T2 is attached to the covered electric wire 1 from which the core wire 2 is exposed and the auxiliary terminal T2 is welded to the bus bar 5 along with the exposed core wire 2.

Specifically, in the connection structure of an electric wire of the second embodiment, the core wire 2 is exposed by removing the insulating covering portion 3 on the end side of the covered electric wire 1, and the auxiliary terminal T2 is attached on the end side of the covered electric wire 1. This auxiliary terminal T2 includes the electric wire grasping portion 8 that grasps the insulating covering portion 3 on the end side of the covered electric wire 1 and a core wire protecting portion 20 provided so as to extend from one end of the electric wire grasping portion 8.

Moreover, the above-described core wire protecting portion 20 is formed roughly in the shape of a fork (roughly in the shape of the letter U) having a base 21 on which the end side of the insulating covering portion 3 is placed and a pair of welded pieces 22 and 22 provided so as to extend from the right and left sides at one end (the front end) of the base 21 toward one side (the front). It is to be noted that the pair of welded pieces 22 and 22 is disposed in parallel on both sides of the core wire 2 exposed from the insulating covering portion 3.

In addition, the second embodiment adopts a structure in which, in a state in which the auxiliary terminal T2 is attached to the covered electric wire 1, the welded pieces 22 and 22 of the auxiliary terminal T2 are welded to one face (the front side) of the bus bar 5 along with the exposed core wire 2.

It is to be noted that, for welding, as in the case of the first embodiment, welding means such as resistance welding, fiber laser welding, and ultrasonic welding are used.

As described above, in the second embodiment, on the end side of the covered electric wire 1, the auxiliary terminal T2 is attached in a state in which the auxiliary terminal T2 grasps (holds) the insulating covering portion 3. Moreover, in the second embodiment, the pair of welded pieces 22 and 22 of the auxiliary terminal T2, which is disposed in parallel on both sides of the core wire 2, is welded to one face (the front side) of the bus bar 5 along with the core wire 2 exposed on the end side of the covered electric wire 1. With this configuration, compared to "a connection structure of an electric wire, in which only a core wire exposed from an insulating covering portion is welded to a bus bar" like the above-described existing technique, it is possible to connect the covered electric wire 1 to the bus bar 5 more firmly. Furthermore, with this configuration, it is possible to greatly reduce a force which is exerted on the welds of the core wire 2 of the covered electric wire 1 and the bus bar 5, which reduces the possibility that the core wire 2 welded to the bus bar 5 becomes detached from the bus bar 5.

Next, the configuration of the auxiliary terminal T2 of the second embodiment will be described with reference to FIGS. 13 to 16, which have been described above, and FIGS. 17 to 24.

Figure 17:
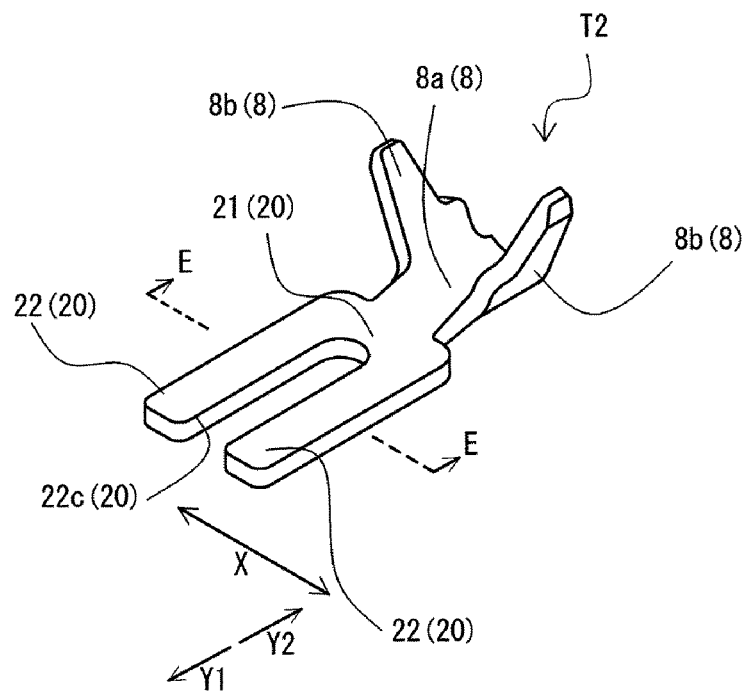
FIG. 17 is a schematic diagram of an auxiliary terminal viewed obliquely from above, which is used in the connection structure of an electric wire of the second embodiment of the present invention.
Figure 18:
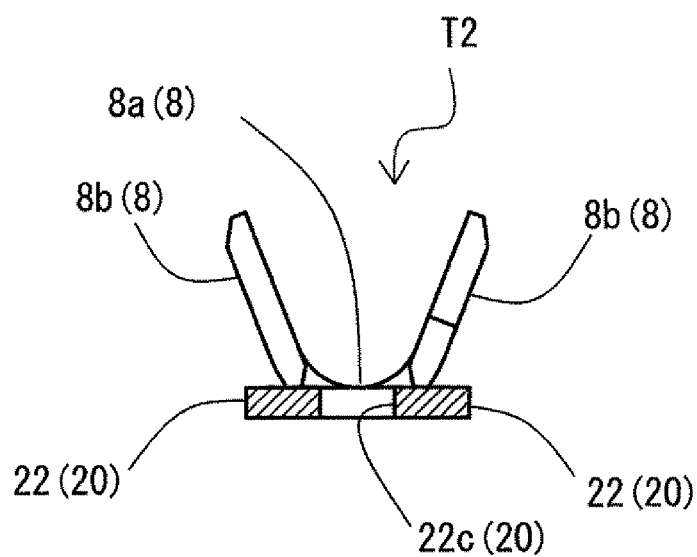
FIG. 18 is a schematic diagram depicting a cross section taken along the line E-E of FIG. 17.
Figure 19:
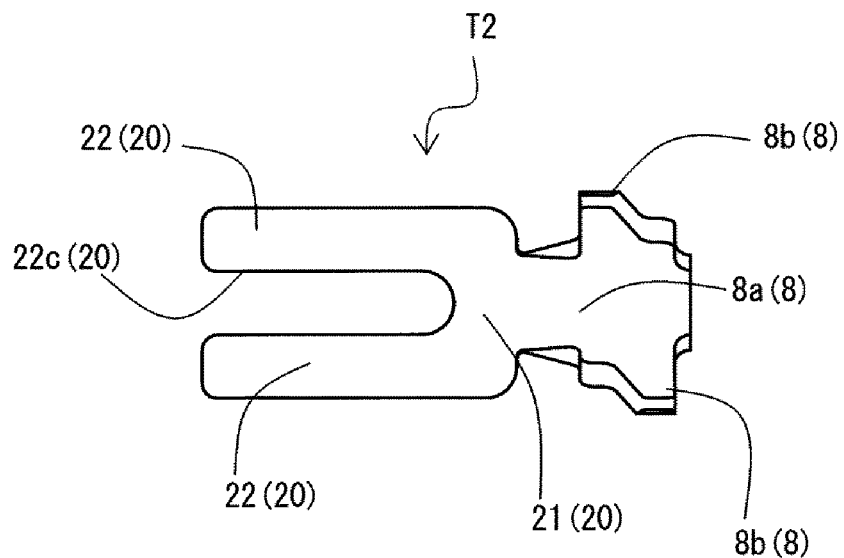
FIG. 19 is a schematic diagram showing a plan view of the auxiliary terminal which is used in the connection structure of an electric wire of the second embodiment of the present invention.
Figure 20:
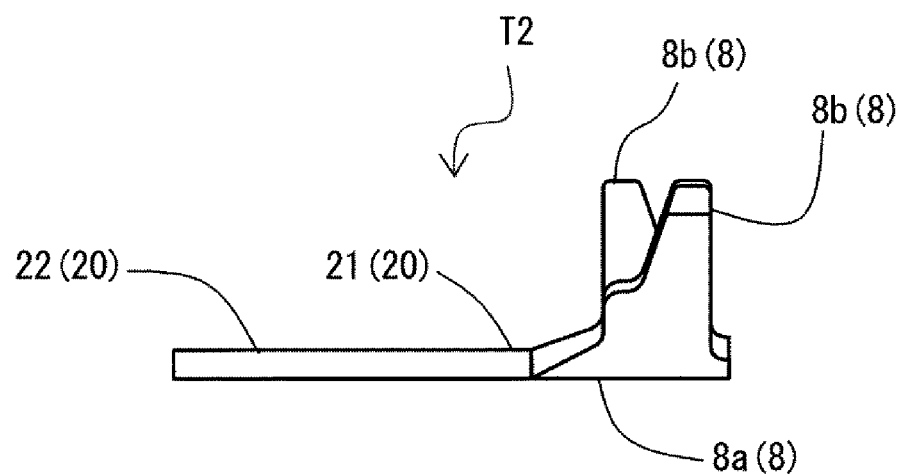
FIG. 20 is a schematic diagram showing a side view of the auxiliary terminal which is used in the connection structure of an electric wire of the second embodiment of the present invention.

Here, FIG. 17 is a schematic diagram of the auxiliary terminal viewed obliquely from above, which is used in the connection structure of an electric wire of the second embodiment. FIG. 18 is a schematic diagram depicting a cross section taken along the line E-E of FIG. 17. FIG. 19 is a schematic diagram showing a plan view of the auxiliary terminal which is used in the connection structure of an electric wire of the second embodiment. FIG. 20 is a schematic diagram showing a side view of the auxiliary terminal which is used in the connection structure of an electric wire of the second embodiment.

Figure 21:
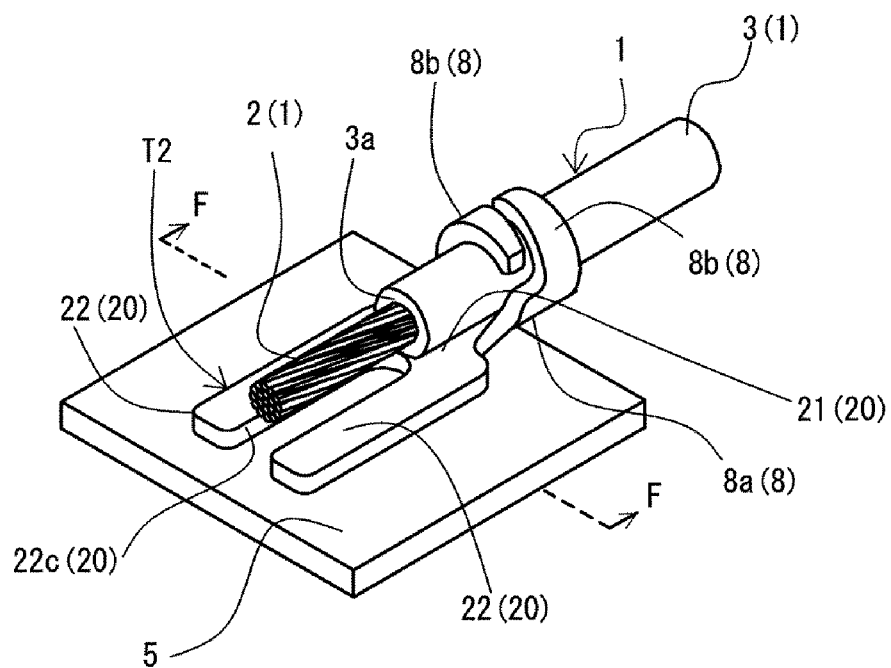
FIG. 21 is a schematic diagram for explaining a connecting process of the connection structure of an electric wire of the second embodiment of the present invention.
Figure 22:
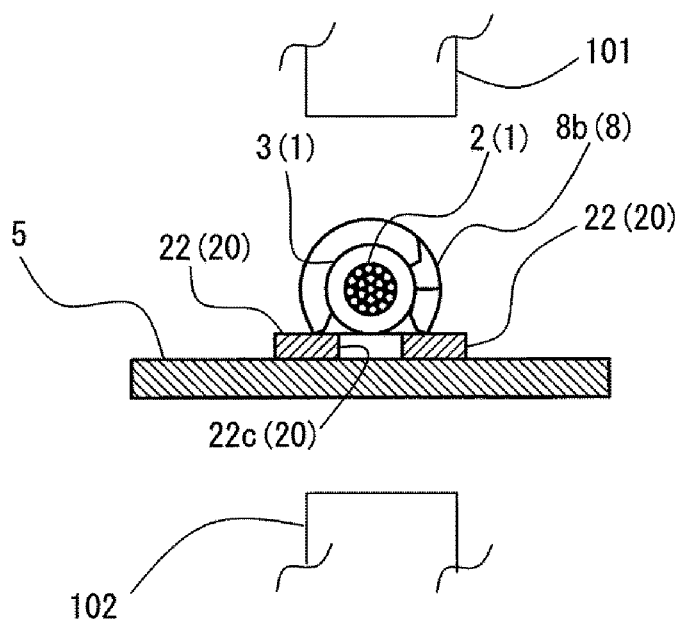
FIG. 22 is a schematic diagram showing a sectional view taken along the line F-F of FIG. 21 and electrodes for welding.
Figure 23:
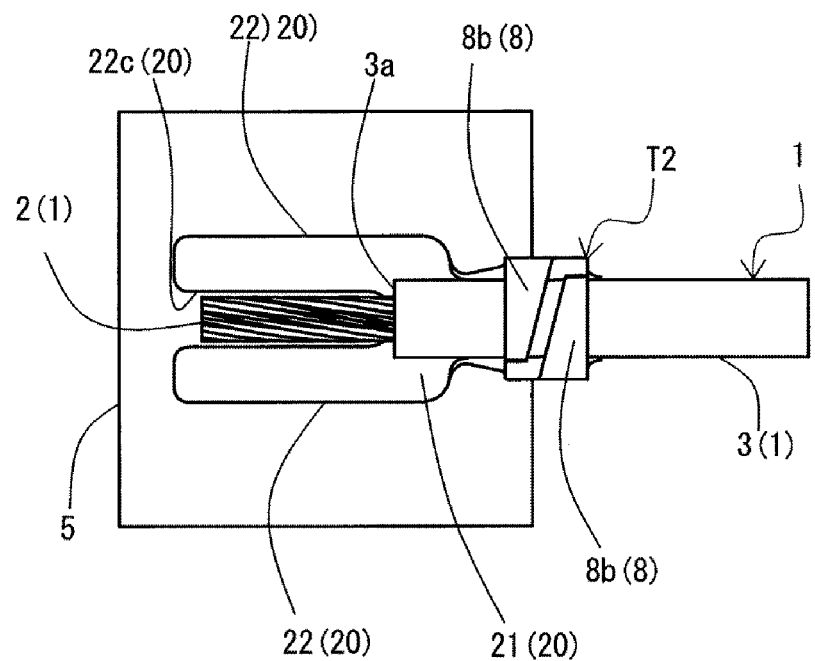
FIG. 23 is a schematic diagram for explaining the connecting process of the connection structure of an electric wire of the second embodiment of the present invention.
Figure 24:
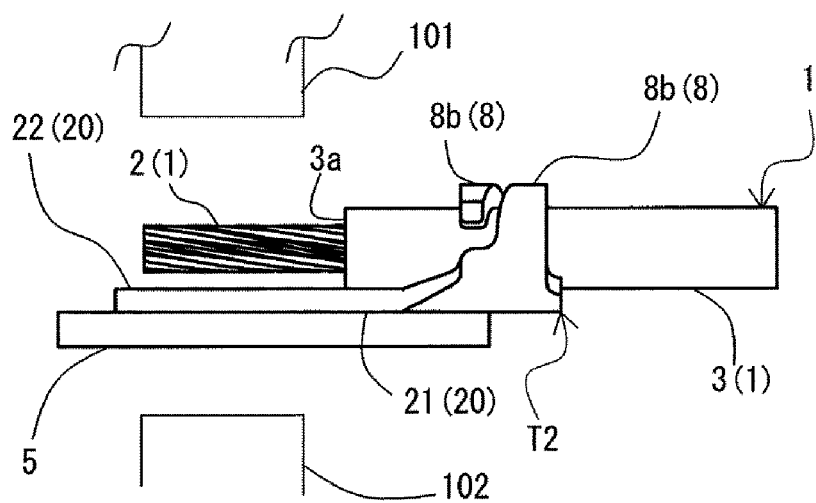
FIG. 24 is a schematic diagram for explaining the connecting process of the connection structure of an electric wire of the second embodiment of the present invention.
Figure 2:
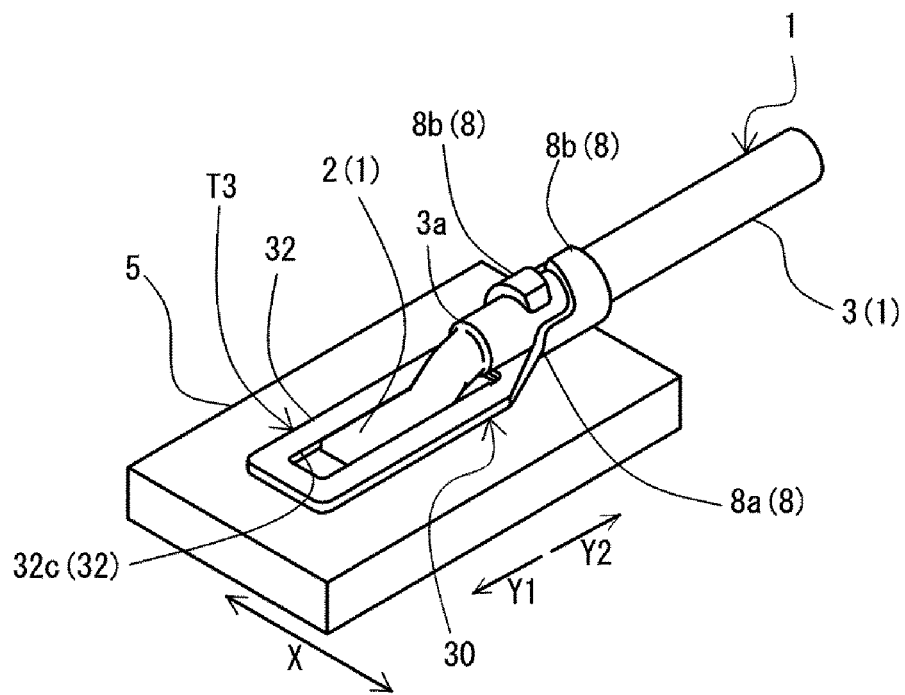
Figure 2:
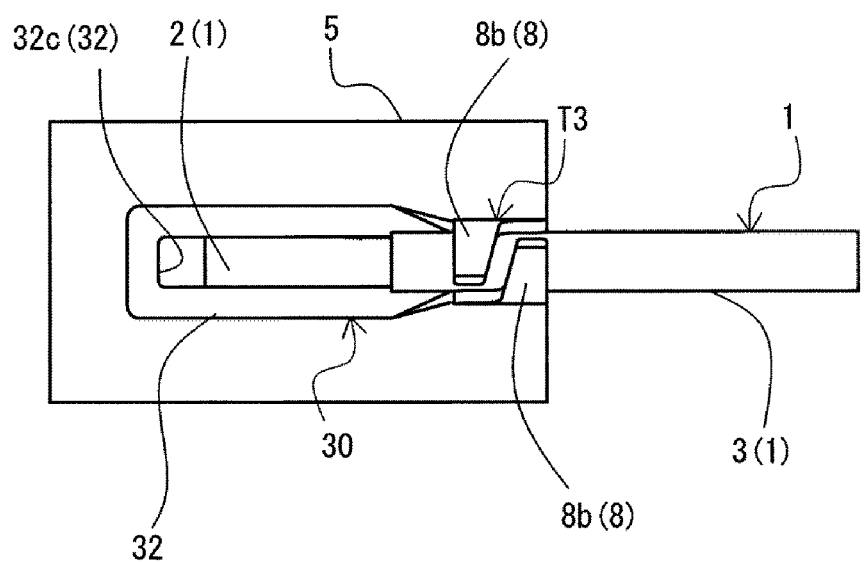

Moreover, FIG. 21 is a schematic diagram for explaining a connecting process of the connection structure of an electric wire of the second embodiment, the schematic diagram showing a pre-welding state, which is viewed obliquely from above, in which the auxiliary terminal is attached on the end side of the covered electric wire and the core wire and the auxiliary terminal are positioned on the bus bar. FIG. 22 is a schematic diagram showing a sectional view taken along the line F-F of FIG. 21 and electrodes for welding. FIG. 23 is a schematic diagram for explaining the connecting process of the connection structure of an electric wire of the second embodiment, the schematic diagram showing a plan view of the pre-welding state in which the auxiliary terminal is attached on the end side of the covered electric wire and the core wire and the auxiliary terminal are positioned on the bus bar. FIG. 24 is a schematic diagram for explaining the connecting process of the connection structure of an electric wire of the second embodiment, the schematic diagram showing a side view of the pre-welding state in which the auxiliary terminal is attached on the end side of the covered electric wire and the core wire and the auxiliary terminal are positioned on the bus bar.

As depicted in FIGS. 17 to 20, the auxiliary terminal T2 of the second embodiment includes the electric wire grasping portion 8 that grasps the insulating covering portion 3 of the covered electric wire 1 and the core wire protecting portion 20 provided so as to extend from one end of the electric wire grasping portion 8. It is to be noted that, since the electric wire grasping portion 8 is the same as that of the first embodiment, an explanation thereof is omitted.

Moreover, the core wire protecting portion 20 has the plate-like base 21 which is provided so as to extend from the bottom face portion 8a of the electric wire grasping portion 8 and the pair of the pair of welded pieces 22 and 22 provided so as extend from the right and left sides at one end (the front end) of the base 21 toward one side (a Y1 direction (see FIG. 17)).

The welded piece 22 is formed in the shape of a rectangular long plate when viewed in a plan view and is provided so as to extend from the base 21 toward the front (the Y1 direction) and to be horizontal to the base 21.

Furthermore, the pair of welded pieces 22 and 22 is disposed so that the welded pieces 22 and 22 are arranged in parallel in such away as to be separated from each other with a predetermined space left therebetween, and a void portion formed between one welded piece 22 and the other welded piece 22 becomes a core wire protective groove 22c. Then, when the auxiliary terminal T2 is attached to the covered electric wire 1, the core wire 2 exposed on the end side of the covered electric wire 1 can be disposed in the position of this core wire protective groove 22c when viewed in a plan view (see FIGS. 21 to 24). Moreover, when the core wire 2 is welded to the bus bar 5, the right and left sides of the core wire 2 come into contact with the pair of welded pieces 22 and 22 (see FIGS. 13 to 15).

It is to be noted that the width of the core wire protective groove 22c (the size thereof in a transverse direction) is designed so as to be a size greater than the diameter of the core wire 2 which is not welded to the bus bar 5 (see FIGS. 21 and 22), the size that brings, when the core wire 2 is welded to the bus bar 5, the sides of the welded core wire 2 into contact with the core wire protective groove 22c (see FIGS. 13 and 14). Furthermore, the length of the core wire protective groove 22c (the size thereof in a longitudinal direction) is designed so as to be a size greater than the core wire 2 exposed from the insulating covering portion 3 by a predetermined size (for example, a few millimeters).

Next, a procedure by which the auxiliary terminal T2 is attached to the covered electric wire 1 will be described.

When the auxiliary terminal T2 is attached to the covered electric wire 1, first, the core wire 2 is exposed by removing the insulating covering portion 3 on the end side of the covered electric wire 1. Next, the end 3a of the insulating covering portion 3 of the covered electric wire 1, from which the core wire 2 is exposed, is positioned and placed on the front end on the upper-face side of the base 21 of the core wire protecting portion 20 of the auxiliary terminal T2. As a result, the insulating covering portion 3 is placed on the base 21 and the bottom face portion 8a of the grasping portion 8. Moreover, at this time, the core wire 2 exposed from the insulating covering portion 3 is positioned and placed in the position of the core wire protective groove 22c formed between the pair of welded pieces 22 and 22.

Then, the grasping pieces 8b and 8b of the electric wire grasping portion 8 are wound around the outer peripheral part of the insulating covering portion 3 placed on the base 21 and the bottom face portion 8a of the electric wire grasping portion 8 and fastened (crimped) thereonto, whereby the auxiliary terminal T2 is attached to the covered electric wire 1.

Next, a process of welding, to the bus bar 5, the covered electric wire 1 to which the auxiliary terminal T2 is attached will be described with reference to FIGS. 13 to 16 and FIGS. 21 to 24.

First, as depicted in FIGS. 21 and 23, the covered electric wire 1 to which the auxiliary terminal T2 is attached is set in a predetermined welding position of the bus bar 5.

Specifically, the covered electric wire 1 to which the auxiliary terminal T2 is attached is prepared and the lower face of the core wire protecting portion 20 (the core wire protecting portion 20 formed of the base 21 and the welded pieces 22) of the auxiliary terminal T2 is positioned and placed in a welding position on one face (the front side) of the bus bar 5, whereby the covered electric wire 1 is set in the state shown in FIGS. 21 and 23. As a result, "the welded pieces 22 of the auxiliary terminal T2" and "the exposed core wire 2 of the covered electric wire 1" are positioned on the side of the bus bar 5 where the upper face thereof is located.

Next, as depicted in FIGS. 22 and 24, above the front side (the upper face) of the bus bar 5 on which the covered electric wire 1 to which the auxiliary terminal T2 is attached is set, the upper electrode 101 for welding is disposed, and, below the back side (the lower face) of the bus bar 5, the lower electrode 102 for welding is disposed. It is to be noted that the upper electrode 101 and the electrode 102 are disposed so as to face each other. Then, after "the back side of the bus bar 5" is placed on the lower electrode 102, the upper electrode 101 is moved downward and pressed against (brought into contact with) "the exposed core wire 2" and "the welded pieces 22 of the auxiliary terminal T2", which are ultrasonically vibrated while being pressurized by the upper electrode 101. As a result, the welded pieces 22 and 22 of the auxiliary terminal T2 are welded to the front side of the bus bar 5 along with the exposed core wire 2 (the state shown in FIGS. 13 to 16 is obtained).

It is to be noted that, as depicted in FIG. 14, the core wire 2 welded to the front side (the upper face) of the bus bar 5 has, in the core wire protective groove 22c formed between the pair of welded pieces 22 and 22 disposed on both sides of the core wire 2, a rectangular cross-sectional shape similar to the cross-sectional shape of the welded piece 22. Moreover, the side faces of the core wire 2 welded to the front side (the upper face) of the bus bar 5 are in contact with the pair of welded pieces 22 and 22.

As described above, in the second embodiment, by attaching the auxiliary terminal T2 to the covered electric wire 1 from which the core wire 2 is exposed and disposing "the pair of welded pieces 22 and 22 of the auxiliary terminal T2" and "the exposed core wire 2" above the bus bar 5 and, in this state, ultrasonically vibrating "the pair of welded pieces 22 and 22 of the auxiliary terminal T2" and "the exposed core wire 2" which are sandwiched between the upper electrode 101 and the lower electrode 102, "the pair of welded pieces 22 and 22" and "the exposed core wire 2" are welded to the bus bar 5. That is, also in the second embodiment, as in the case of the first embodiment, there is no possibility of a substantial increase in time and trouble needed to perform a connecting operation as in a method of connecting an electric wire by using a bolt and a nut.

Moreover, in the second embodiment, the auxiliary terminal T2 is welded to the bus bar 5 along with the core wire 2 exposed from the insulating covering portion 3 in a state in which the auxiliary terminal T2 grasps (holds) the insulating covering portion 3 on the end side of the covered electric wire 1. With this configuration, as in the case of the first embodiment, compared to the above-described existing technique, the second embodiment can reduce a force which is exerted on the welds of the core wire 2 of the covered electric wire 1 and the bus bar 5, which prevents the core wire 2 welded to the bus bar 5 from becoming detached from the bus bar 5.

Furthermore, in the second embodiment, when the core wire 2 is welded to the bus bar 5, in a state in which the pair of welded pieces 22 and 22 is disposed on the right and left sides of the core wire 2 when viewed in a plan view, the core wire 2 and the welded pieces 22 and 22 are ultrasonically vibrated while being pressurized by the upper electrode 101 pressed against them from above. As a result, the core wire 2 is compressed to the thickness of "the pair of welded pieces 22 and 22" and the work height H (the height of a welding cross-section) of the core wire 2 is reduced (see FIG. 14). Moreover, also in the second embodiment, as in the case of the first embodiment, the work height H of the core wire 2 is set so as to be the same as the height of "the pair of welded pieces 22 and 22". Thus, in the second embodiment, "the exposed core wire 2" and "the pair of welded pieces 22 and 22" have the stable shape of an integrated rectangular parallelepiped. As a result, an improvement in the flexural capacity of the welding boundary surface of the core wire 2 which is physically weak and an improvement in tensile strength including the insulating covering portion 3 are achieved.

In addition, in the second embodiment, as in the case of the first embodiment, since the core wire 2 is disposed between the plate-like "welded pieces 22 and 22" of the auxiliary terminal T2 and welded to the bus bar 5, the pressing faces of the upper electrode 101 and the lower electrode 102 can be formed as virtually planar surfaces, which eliminates the need to provide an electrode having a special shape.

Third Embodiment

Next, the connection structure of an electric wire of the third embodiment of the present invention and the auxiliary terminal which is used in this connection structure will be described.

It is to be noted that the third embodiment uses an auxiliary terminal T3 in place of the auxiliary terminal T1 of the above-described first embodiment and the configurations of the covered electric wire 1 and the bus bar 5 are the same as those of the first embodiment. In the following description, the same components as those of the first embodiment are identified with the same reference signs and explanations thereof will be simplified (or omitted).

First, the schematic configuration of the connection structure of an electric wire of the third embodiment will be described with reference to FIGS. 25 to 27.

Here, FIG. 25 is a schematic diagram of the connection structure of an electric wire of the third embodiment, which is viewed obliquely from above. Moreover, FIG. 26 is a schematic diagram showing a plan view of the connection structure of an electric wire of the third embodiment. FIG. 27 is a schematic diagram showing a side view of the connection structure of an electric wire of the third embodiment.

Figure 27:
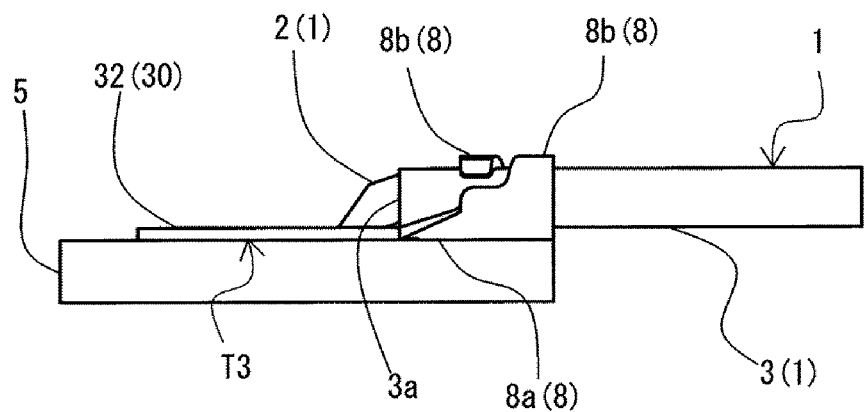
FIG. 27 is a schematic diagram showing a side view of the connection structure of an electric wire of the third embodiment of the present invention.

As depicted in FIGS. 25 to 27, in the connection structure of an electric wire of the third embodiment, the auxiliary terminal T3 is attached to the covered electric wire 1 from which the core wire 2 is exposed and the auxiliary terminal T3 is welded to the bus bar 5 along with the exposed core wire 2.

Specifically, in the connection structure of an electric wire of the third embodiment, the core wire 2 is exposed by removing the insulating covering portion 3 on the end side of the covered electric wire 1, and the auxiliary terminal T3 is attached on the end side of the covered electric wire 1. Moreover, the auxiliary terminal T3 includes the electric wire grasping portion 8 that grasps the insulating covering portion 3 on the end side of the covered electric wire 1 and a core wire protecting portion 30 provided so as to extend from one end (the front end) of the electric wire grasping portion 8.

The above-described core wire protecting portion 30 is formed of a plate-like welded piece 32 which is provided so as to extend from the electric wire grasping portion 8. Furthermore, the welded piece 32 is disposed near the exposed core wire 2. More specifically, the welded piece 2 has a core wire protective hole 32c formed therein, the core wire protective hole 32c into which the exposed core wire 2 is inserted and disposed, and this welded piece 32 surrounds the periphery (the right and left sides and the front end) of the core wire 2.

In addition, the third embodiment adopts a structure in which, in a state in which the auxiliary terminal T3 is attached to the covered electric wire 1, the welded piece 32 of the auxiliary terminal T3 is welded to one face (the front side) of the bus bar 5 along with the exposed core wire 2.

It is to be noted that, for welding, as in the case of the first embodiment, welding means such as resistance welding, fiber laser welding, and ultrasonic welding are used.

As described above, in the third embodiment, the auxiliary terminal T3 is attached on the end side of the covered electric wire 1 in a state in which the auxiliary terminal T3 grasps (holds) the insulating covering portion 3. Moreover, in the third embodiment, the welded piece 32 surrounding the periphery (the sides and the front end) of the core wire 2 is welded to one face (the front side) of the bus bar 5 along with the core wire 2 exposed on the end side of the covered electric wire 1. With this configuration, compared to "a connection structure of an electric wire, in which only a core wire exposed from an insulating covering portion is welded to a bus bar" like the above-described existing technique, it is possible to connect the covered electric wire 1 to the bus bar 5 more firmly. Furthermore, with this configuration, it is possible to greatly reduce a force which is exerted on the welds of the core wire 2 of the covered electric wire 1 and the bus bar 5, which reduces the possibility that the core wire 2 welded to the bus bar 5 becomes detached from the bus bar 5.

Next, the configuration of the auxiliary terminal T3 of the third embodiment will be described with reference to FIGS. 25 to 27, which have been described above, and FIGS. 28 to 30.

Figure 28:
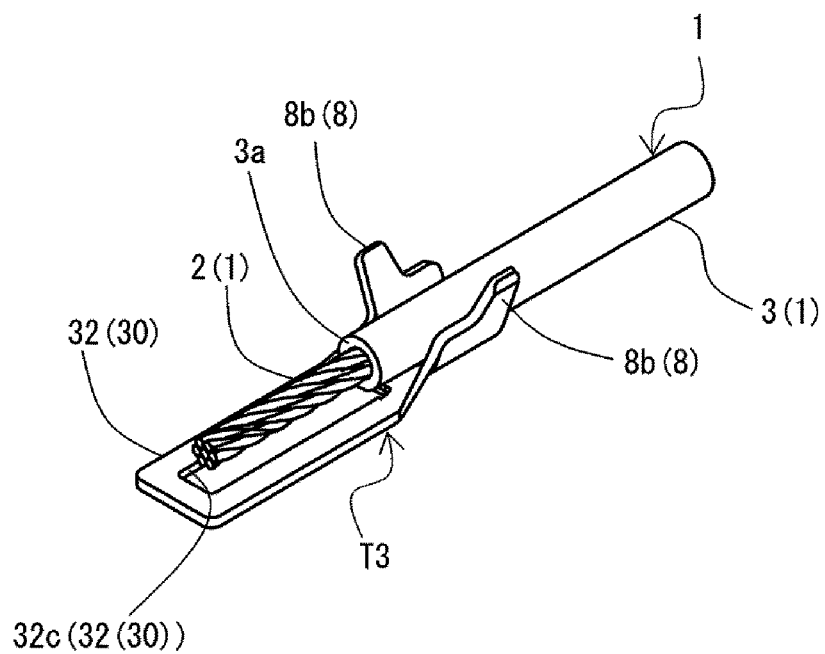
FIG. 28 is a schematic diagram of a covered electric wire and an auxiliary terminal viewed obliquely from above, which are used in the connection structure of an electric wire of the third embodiment of the present invention.
Figure 29:
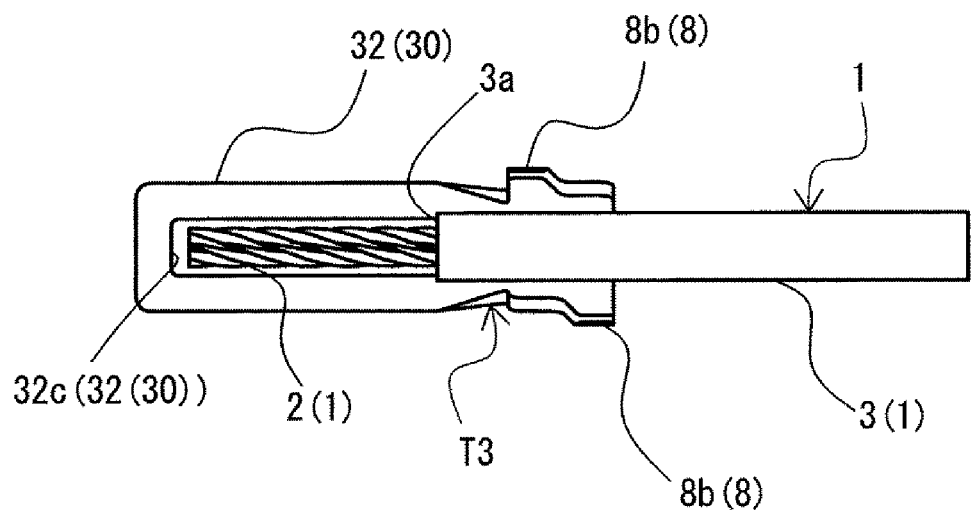
FIG. 29 is a schematic diagram showing a plan view of the covered electric wire and the auxiliary terminal which are used in the connection structure of an electric wire of the third embodiment of the present invention.
Figure 30:
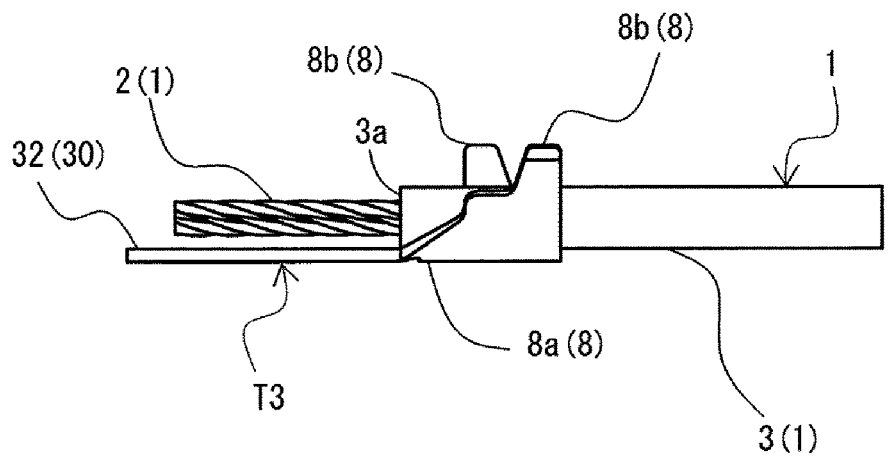
FIG. 30 is a schematic diagram showing a side view of the covered electric wire and the auxiliary terminal which are used in the connection structure of an electric wire of the third embodiment of the present invention.

Here, FIG. 28 is a schematic diagram of the covered electric wire and the auxiliary terminal viewed obliquely from above, which are used in the connection structure of an electric wire of the third embodiment. FIG. 29 is a schematic diagram showing a plan view of the covered electric wire and the auxiliary terminal which are used in the connection structure of an electric wire of the third embodiment. FIG. 30 is a schematic diagram showing a side view of the covered electric wire and the auxiliary terminal which are used in the connection structure of an electric wire of the third embodiment.

It is to be noted that FIGS. 28 to 30 show a state in which the auxiliary terminal T3 is not attached to the covered electric wire 1 and the covered electric wire 1 is positioned in the attachment position of the auxiliary terminal T2.

As depicted in FIGS. 28 to 30, the auxiliary terminal T3 of the third embodiment includes the electric wire grasping portion 8 that grasps the insulating covering portion 3 of the covered electric wire 1 and the core wire protecting portion 30 provided so as to extend from one end of the electric wire grasping portion 8. It is to be noted that, since the electric wire grasping portion 8 is the same as that of the first embodiment, an explanation thereof is omitted.

Moreover, the core wire protecting portion 30 has the plate-like welded piece 32 which is provided so as to extend from the bottom face portion 8a of the electric wire grasping portion 8. This welded piece 32 has the core wire protective hole 32c formed therein, the core wire protective hole 32c in which the core wire 2 exposed from the insulating covering portion 3 is disposed, and has the shape of a rectangular frame.

Then, when the auxiliary terminal T3 is attached to the covered electric wire 1, the core wire 2 exposed on the end side of the covered electric wire 1 is disposed in the position of the core wire protective hole 32c when viewed in a plan view. Moreover, when the core wire 2 is welded to the bus bar 5, the right and left sides and the front end of the core wire 2 are covered with the inner side face of the core wire protective hole 32c.

It is to be noted that the width of the core wire protective hole 32c (the size thereof in a transverse direction) is designed so as to be a breadth greater than the diameter of the core wire 2 which is not welded to the bus bar 5 (see FIGS. 28 and 29), the breadth that brings, when the core wire 2 is welded to the bus bar 5, the sides of the welded core wire 2 into contact with the core wire protective hole 32c (see FIGS. 25 and 26).

Moreover, the length of the core wire protective hole 32c (the size thereof in a longitudinal direction) is designed so as to be a size greater than the core wire 2 exposed from the insulating covering portion 3 by a predetermined size (for example, a few millimeters).

Next, a procedure by which the auxiliary terminal T3 is attached to the covered electric wire 1 will be described.

When the auxiliary terminal T3 is attached to the covered electric wire 1, first, the core wire 2 is exposed by removing the insulating covering portion 3 on the end side of the covered electric wire 1. Next, the end 3a of the insulating covering portion 3 of the covered electric wire 1 from which the core wire 2 is exposed is positioned and placed at the edge of the other end (the rear end) of the core wire protective hole 32c on the upper-face side of the welded piece 32 of the auxiliary terminal T3. As a result, the insulating covering portion 3 is placed at the rear end of the welded piece 32 and on the bottom face portion 8a of the grasping portion 8. Moreover, at this time, the core wire 2 exposed from the insulating covering portion 3 is disposed by being positioned in the position of the core wire protective hole 32c.

Then, by winding the grasping pieces 8b and 8b of the electric wire grasping portion 8 around the outer peripheral part of the insulating covering portion 3 placed on the bottom face portion 8a of the grasping portion 8 and fastening (crimping) the grasping pieces 8b and 8b thereonto, the auxiliary terminal T2 is attached to the covered electric wire 1.

Then, in accordance with a process similar to those of the first and second embodiments described above, the covered electric wire 1 to which the auxiliary terminal T3 is attached is welded to the bus bar 5, and the state shown in FIGS. 25 to 27 described above is obtained.

That is, the state in which the welded piece 32 of the auxiliary terminal T3 is welded to the upper face of the bus bar 5 along with the exposed core wire 2 is obtained.

It is to be noted that, also in the third embodiment, the core wire 2 welded to one face (the front side) of the bus bar 5 has a rectangular cross-sectional shape (not depicted in the drawing) in the core wire protective hole 32c of the welded piece 32. Moreover, the side faces of the core wire 2 welded to the upper face of the bus bar 5 are in contact with the longitudinal inner side faces of the core wire protective hole 32c.

Moreover, in the third embodiment, when the core wire 2 is welded to the bus bar 5, the welded piece 32 surrounding the right and left sides and the front end of the core wire 2 is disposed when viewed in a plan view. Then, in this state, the core wire 2 and the welded piece 32 are ultrasonically vibrated while being pressurized by the upper electrode 101 pressed against them from above. As a result, as in the case of the first and second embodiments described above, the core wire 3 is compressed to the thickness of the welded piece 32 and the work height H (the height of a welding cross-section) of the core wire 2 is reduced. Furthermore, also in the third embodiment, as in the case of the first and second embodiments, the work height H of the core wire 2 is set so as to be the same as the height of "the welded piece 32", and "the exposed core wire 2" and "the welded piece 32" have the stable shape of an integrated rectangular parallelepiped.

Fourth Embodiment

Next, a modified example of the fourth embodiment of the present invention will be described with reference to FIGS. 31 to 33.

Here, the fourth embodiment is obtained by modifying part of the configuration of the core wire protecting portion 30 of the auxiliary terminal T3 of the above-described third embodiment. Thus, in the following description, only a portion different from that of the third embodiment will be described, and the same components as those of the third embodiment will be identified with the same reference signs and explanations thereof will be simplified (or omitted).

Figure 31:
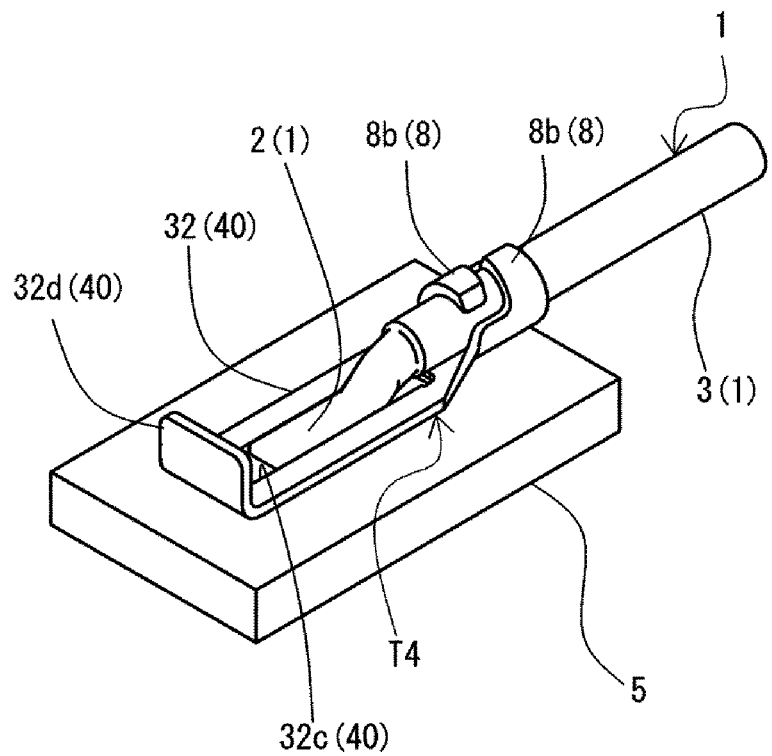
FIG. 31 is a schematic diagram of a connection structure of an electric wire of a fourth embodiment of the present invention, which is viewed obliquely from above.

Here, FIG. 31 is a schematic diagram of a connection structure of an electric wire of the modified example of the fourth embodiment, which is viewed obliquely from above. FIG. 32 is a schematic diagram showing a plan view of the connection structure of an electric wire of the modified example of the fourth embodiment. FIG. 33 is a schematic diagram showing a side view of the connection structure of an electric wire of the modified example of the fourth embodiment.

Figure 32:
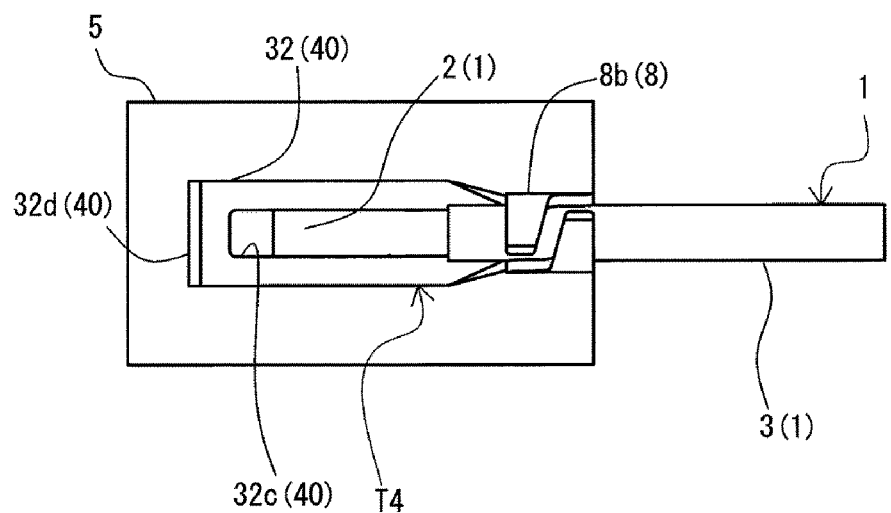
FIG. 32 is a schematic diagram showing a plan view of the connection structure of an electric wire of the fourth embodiment of the present invention of the present invention.
Figure 33:
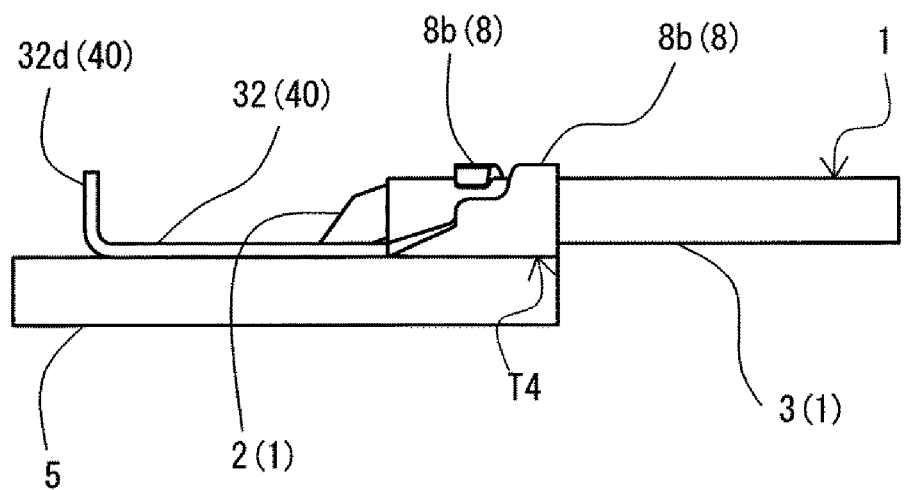
FIG. 33 is a schematic diagram showing a side view of the connection structure of an electric wire of the fourth embodiment of the present invention of the present invention.

As depicted in FIGS. 31 to 33, as in the case of the third embodiment, an auxiliary terminal T4 of the electric wire connection structure of the fourth embodiment includes the electric wire grasping portion 8 that grasps the insulating covering portion 3 of the covered electric wire 1 and a core wire protecting portion 40 provided so as to extend from one end of the electric wire grasping portion 8.

Moreover, as in the case of the third embodiment, the core wire protecting portion 40 of the auxiliary terminal T4 includes the plate-like welded piece 32 which is provided so as to extend from the bottom face portion 8a of the electric wire grasping portion 8. Furthermore, in the welded piece 32, as in the case of the above-described third embodiment, the core wire protective hole 32c is provided.

In addition, the core wire protecting portion 40 has a standing piece 32d formed at the front end of the above-described welded piece 32, the standing piece 32d which bends at almost aright angle to the welded piece 32 and extends in a perpendicular direction.

It is to be noted that the auxiliary terminal T4 is the same as the auxiliary terminal T3 of the third embodiment except that the standing piece 32d is provided in the welded piece 32.

As described above, the configuration of the auxiliary terminal T4 of the fourth embodiment is obtained by adding the standing piece 32d to the auxiliary terminal T3 of the above-described third embodiment. Thus, the connection structure of an electric wire of the fourth embodiment can obtain the effects similar to those of the above-described third embodiment.

Moreover, in a production site such as a factory, after the auxiliary terminal T4 is attached to the covered electric wire 1, the covered electric wire 1 to which the auxiliary terminal T4 is attached is sometimes moved before it is welded to the bus bar 5. For example, a working area in which an attaching process of attaching the auxiliary terminal T4 to the covered electric wire 1 is sometimes away from a working area in which a welding process of welding, to the bus bar 5, the covered electric wire 1 to which the auxiliary terminal T4 is attached. In such a case, the covered electric wire 1 to which the auxiliary terminal T4 is attached is moved from the working area in which the attaching process is performed to the working area in which the welding process is performed; however, since the standing piece 32d is provided in the auxiliary terminal T4, the core wire 3 is protected from deformation at the time of movement.

As described above, according to the embodiments (the first to fourth embodiments) of the present invention, it is possible to provide the connection structures of an electric wire, the connection structures which can connect the covered electric wire 1 to the conductive metal plate such as the bus bar 5 without greatly increasing a burden of a connecting operation, and the auxiliary terminals T1 to T4 for connecting an electric wire to the conductive metal plate.

It is to be noted that the present invention is not limited to the above-described embodiments (first to fourth embodiments) and various changes and modifications can be made thereto without departing from the spirit of the present invention.

For example, only in the auxiliary terminal T1 of the first embodiment of the above-described first to fourth embodiments, the welded piece (the back-side welded piece) 13 which is welded to the lower face of the bus bar 5 is provided, but the present invention is not limited thereto. A component corresponding to the welded piece (the back-side welded piece) 13 may be provided in the auxiliary terminals T2 to 4 of the second to fourth embodiments.

Moreover, for instance, a configuration in which the welded piece (the back-side welded piece) 13 is not provided in the auxiliary terminal T1 of the first embodiment may be adopted.

REFERENCE SIGNS LIST

1 . . . covered electric wire
2 . . . core wire
3 . . . insulating covering portion
3a . . . end (insulating covering portion)
5 . . . bus bar
5a . . . end (bus bar)
T1 . . . auxiliary terminal
8 . . . electric wire grasping portion
8a . . . bottom face portion
8b . . . grasping piece
10 . . . core wire protecting portion
11 . . . base
12 . . . welded piece
12a . . . oblique piece portion
12b . . . horizontal piece portion
12c . . . core wire protective groove
13 . . . welded piece
13a . . . oblique piece portion
13b . . . horizontal portion
T2 . . . auxiliary terminal
20 . . . core wire protecting portion
21 . . . base
22 . . . welded piece
22c . . . core wire protective groove
T3 . . . auxiliary terminal
30 . . . core wire protecting portion
32 . . . welded piece
32c . . . core wire protective hole
T4 . . . auxiliary terminal
40 . . . core wire protecting portion
32d . . . standing piece
101 . . . upper electrode
102 . . . lower electrode

The invention claimed is:

1. A connection structure of an electric wire, the connection structure which connects a core wire exposed, on an end side of a covered electric wire with an insulating covering portion covering an outer periphery of the core wire, from the insulating covering portion to a conductive metal plate, wherein on the end side of the covered electric wire, an auxiliary terminal including an electric wire grasping portion which grasps the insulating covering portion of the covered electric wire and a core wire protecting portion provided so as to extend from one end of the electric wire grasping portion is attached, the core wire protecting portion includes a base on which the insulating covering portion is placed and a welded piece which is provided so as to extend from the base and disposed near the core wire exposed from the insulating covering portion, and the welded piece is welded to one face of the conductive metal plate along with the exposed core wire.

2. The connection structure of an electric wire according to claim 1, wherein the welded piece is formed of a pair of plate-like pieces provided so as to extend from right and left sides at one end of the base toward one side, and the pair of plate-like pieces is disposed on right and left sides of the exposed core wire.

3. The connection structure of an electric wire according to claim 2, wherein in the core wire protecting portion, a back-side welded piece which is welded to a side of the conductive metal plate where another face thereof is located is formed, and the conductive metal plate is sandwiched between the welded piece and the back-side welded piece.

4. The connection structure of an electric wire according to claim 3, wherein a thickness of the core wire which is welded to one face of the conductive metal plate is nearly equal to a thickness of the welded piece which is welded to the one face and sides of the core wire are in contact with the welded piece.

5. The connection structure of an electric wire according to claim 2, wherein a thickness of the core wire which is welded to one face of the conductive metal plate is nearly equal to a thickness of the welded piece which is welded to the one face and sides of the core wire are in contact with the welded piece.

6. The connection structure of an electric wire according to claim 1, wherein in the core wire protecting portion, a back-side welded piece which is welded to a side of the conductive metal plate where another face thereof is located is formed, and the conductive metal plate is sandwiched between the welded piece and the back-side welded piece.

7. The connection structure of an electric wire according to claim 6, wherein a thickness of the core wire which is welded to one face of the conductive metal plate is nearly equal to a thickness of the welded piece which is welded to the one face and sides of the core wire are in contact with the welded piece.

8. The connection structure of an electric wire according to claim 1, wherein a thickness of the core wire which is welded to one face of the conductive metal plate is nearly equal to a thickness of the welded piece which is welded to the one face and sides of the core wire are in contact with the welded piece.

9. A connection structure of an electric wire, the connection structure which connects a core wire exposed, on an end side of a covered electric wire with an insulating covering portion covering an outer periphery of the core wire, from the insulating covering portion to a conductive metal plate, wherein on the end side of the covered electric wire, an auxiliary terminal including an electric wire grasping portion which grasps the insulating covering portion of the covered electric wire and a core wire protecting portion provided so as to extend from one end of the electric wire grasping portion is attached, the core wire protecting portion includes a plate-like welded piece which is provided so as to extend from the electric wire grasping portion, in the welded piece, a core wire protective hole into which the exposed core wire is inserted and disposed is formed, and the welded piece is welded to one face of the conductive metal plate along with the exposed core wire.

10. The connection structure of an electric wire according to claim 9, wherein the welded piece has a standing piece formed at a front end thereof, the standing piece which bends at almost a right angle and extends in a direction perpendicular to the conductive metal plate.

11. The connection structure of an electric wire according to claim 10, wherein in the core wire protecting portion, a back-side welded piece which is welded to a side of the conductive metal plate where another face thereof is located is formed, and the conductive metal plate is sandwiched between the welded piece and the back-side welded piece.

12. The connection structure of an electric wire according to claim 11, wherein a thickness of the core wire which is welded to one face of the conductive metal plate is nearly equal to a thickness of the welded piece which is welded to the one face and sides of the core wire are in contact with the welded piece.

13. The connection structure of an electric wire according to claim 10, wherein a thickness of the core wire which is welded to one face of the conductive metal plate is nearly equal to a thickness of the welded piece which is welded to the one face and sides of the core wire are in contact with the welded piece.

14. The connection structure of an electric wire according to claim 9, wherein in the core wire protecting portion, a back-side welded piece which is welded to a side of the conductive metal plate where another face thereof is located is formed, and the conductive metal plate is sandwiched between the welded piece and the back-side welded piece.

15. The connection structure of an electric wire according to claim 14, wherein a thickness of the core wire which is welded to one face of the conductive metal plate is nearly equal to a thickness of the welded piece which is welded to the one face and sides of the core wire are in contact with the welded piece.

16. The connection structure of an electric wire according to claim 9, wherein a thickness of the core wire which is welded to one face of the conductive metal plate is nearly equal to a thickness of the welded piece which is welded to the one face and sides of the core wire are in contact with the welded piece.

17. An auxiliary terminal that is used to connect a core wire exposed, on an end side of a covered electric wire with an insulating covering portion covering an outer periphery of the core wire, from the insulating covering portion to a conductive metal plate, the auxiliary terminal comprising:
- an electric wire grasping portion that grasps the insulating covering portion of the covered electric wire; and
- a core wire protecting portion provided so as to extend from one end of the electric wire grasping portion, wherein the electric wire grasping portion includes a bottom face portion on which the insulating covering portion of the covered electric wire is placed, and, on both sides of the bottom face portion, a grasping piece which grasps the covered electric wire by being wound around the insulating covering portion is formed, the core wire protecting portion is formed roughly in a shape of a fork having a plate-like base which is provided so as to extend from the bottom face portion of the electric wire grasping portion and a pair of welded pieces provided so as to extend from right and left sides at one end of the base toward one side, a void portion formed between one of the welded pieces and the other of the welded pieces becomes a core wire protective groove, and an end side of the insulating covering portion of the covered electric wire is placed on the bottom face portion and the base, when the insulating covering portion is grasped by the grasping piece, the exposed core wire is disposed in a position of the core wire protective groove, and the welded pieces are welded to one face of the conductive metal plate along with the exposed core wire.

18. An auxiliary terminal that is used to connect a core wire exposed, on an end side of a covered electric wire with an insulating covering portion covering an outer periphery of the core wire, from the insulating covering portion to a conductive metal plate, the auxiliary terminal comprising:
- an electric wire grasping portion that grasps the insulating covering portion of the covered electric wire; and
- a core wire protecting portion provided so as to extend from one end of the electric wire grasping portion, wherein the electric wire grasping portion includes a bottom face portion on which the insulating covering portion of the covered electric wire is placed, and, on both sides of the bottom face portion, a grasping piece which grasps the covered electric wire by being wound around the insulating covering portion is formed, the core wire protecting portion is formed of a plate-like welded piece which is provided so as to extend from the bottom face portion of the electric wire grasping portion, in the welded piece, a core wire protective hole into which the exposed core wire is inserted and disposed is formed, and an end side of the insulating covering portion of the covered electric wire is placed on the bottom face portion, when the insulating covering portion is grasped by the grasping piece, the exposed core wire is disposed in the core wire protective hole, and the welded piece is welded to one face of the conductive metal plate along with the exposed core wire.

* * * * *